(12) United States Patent
Zhong et al.

(10) Patent No.: US 11,692,412 B2
(45) Date of Patent: Jul. 4, 2023

(54) HIGH PERFORMANCE REGULAR AND HIGH EXPANSION ELEMENTS FOR OIL AND GAS APPLICATIONS

(71) Applicant: Halliburton Energy Services, Inc., Houston, TX (US)

(72) Inventors: Xiaoguang Allan Zhong, Carrollton, TX (US); Anthony Phan, Carrollton, TX (US); Chad William Glaesman, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 135 days.

(21) Appl. No.: 17/152,887

(22) Filed: Jan. 20, 2021

(65) Prior Publication Data

US 2021/0230965 A1    Jul. 29, 2021

Related U.S. Application Data

(60) Provisional application No. 62/965,539, filed on Jan. 24, 2020.

(51) Int. Cl.
| | |
|---|---|
| *E21B 33/12* | (2006.01) |
| *E21B 33/128* | (2006.01) |
| *E21B 33/13* | (2006.01) |
| *C08G 18/38* | (2006.01) |
| *C08G 18/81* | (2006.01) |
| *C09D 11/102* | (2014.01) |

(52) U.S. Cl.
CPC .......... *E21B 33/13* (2013.01); *C08G 18/3876* (2013.01); *C08G 18/8125* (2013.01); *C09D 11/102* (2013.01); *E21B 33/1208* (2013.01); *E21B 33/128* (2013.01); *E21B 33/1216* (2013.01)

(58) Field of Classification Search
CPC . E21B 33/1208; E21B 33/1216; E21B 33/128
See application file for complete search history.

(56) References Cited

U.S. PATENT DOCUMENTS

| | | | |
|---|---|---|---|
| 5,091,471 A | 2/1992 | Graves et al. | |
| 8,714,270 B2 * | 5/2014 | Clemens | ................. E21B 23/01 166/381 |
| 10,358,890 B2 | 7/2019 | Zhong et al. | |
| 2014/0329080 A1 * | 11/2014 | Becker-Willinger | ........................ C09D 163/00 427/386 |
| 2016/0257786 A1 | 9/2016 | Fripp et al. | |

(Continued)

FOREIGN PATENT DOCUMENTS

| | | |
|---|---|---|
| EP | 1019613 B1 | 4/2005 |
| WO | 2015163889 A1 | 10/2015 |

(Continued)

*Primary Examiner* — Catherine Loikith

(74) *Attorney, Agent, or Firm* — Scott Richardson; Parker Justiss, P.C.

(57) ABSTRACT

A downhole sealing device, a well system employing a downhole sealing device, and a method for sealing within a wellbore. The downhole sealing device, in one aspect, includes one or more downhole sealing features, and an elastomeric element comprising a thiourethane/acrylate polymer coupled to the one or more downhole sealing features. In at least one aspect, the elastomeric element is operable to be compressed in a downhole application against a tubular as a seal.

29 Claims, 10 Drawing Sheets

(56) References Cited

U.S. PATENT DOCUMENTS

2017/0291357 A1    10/2017  Fong et al.
2018/0187509 A1     7/2018  Zhong et al.
2019/0127596 A1     5/2019  Ellson et al.

FOREIGN PATENT DOCUMENTS

WO    2017039619 A1    3/2017
WO    2017039661 A1    3/2017
WO    2019168621 A1    9/2019
WO    2021150547 A1    7/2021

\* cited by examiner

HIGH PERFORMANCE REGULAR AND HIGH EXPANSION ELEMENTS FOR OIL AND GAS APPLICATIONS

CROSS-REFERENCE TO RELATED APPLICATION

This application claims priority to U.S. Application Ser. No. 62/965,539 filed on Jan. 24, 2020, entitled "3D PRINTED HIGH PERFORMANCE REGULAR AND HIGH EXPANSION ELEMENTS FOR OIL AND GAS APPLICATIONS," which is commonly assigned with this application and incorporated herein by reference in its entirety.

BACKGROUND

There are significant challenges in the design of high performance regular and high expansion elements (e.g., sealing elements, such as packer elements, plugs, etc.) for oil and gas applications. Such element designs are often complex, e.g. involving many pieces of sealing elements, for example as included in through tubing bridge plugs. One way to simplify the design is to build a single element (e.g., with internal features that control its own deployment). Currently, however, there are no robust single element materials for downhole sealing applications. Available rubber, like 3D printed polymers, are typically brittle, have low fracture toughness and low elongation at break.

BRIEF DESCRIPTION

Reference is now made to the following descriptions taken in conjunction with the accompanying drawings, in which.

DETAILED DESCRIPTION

Figure 1:
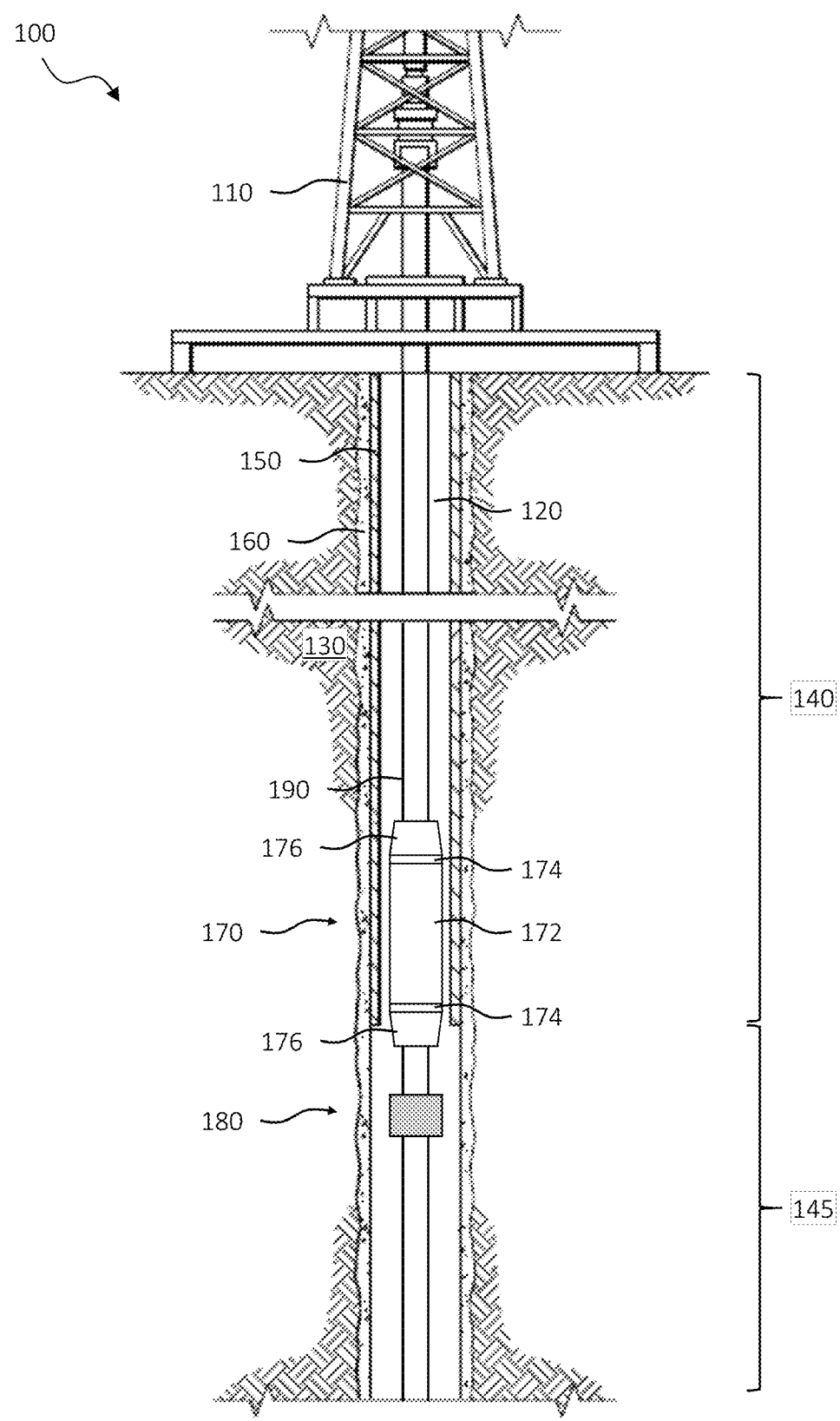
FIGS. 1 and 2 are perspective views of a well system including an exemplary operating environment that the apparatuses, systems and methods disclosed herein may be employed.

In the drawings and descriptions that follow, like parts are typically marked throughout the specification and drawings with the same reference numerals, respectively. The drawn figures are not necessarily, but may be, to scale. Certain features of the disclosure may be shown exaggerated in scale or in somewhat schematic form and some details of certain elements may not be shown in the interest of clarity and conciseness.

The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results. Moreover, all statements herein reciting principles and aspects of the disclosure, as well as specific examples thereof, are intended to encompass equivalents thereof. Additionally, the term, "or," as used herein, refers to a non-exclusive or, unless otherwise indicated.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "uphole," "upstream," or other like terms shall be construed as generally toward the surface of the well; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical or horizontal axis. Unless otherwise specified, use of the term "subterranean formation" shall be construed as encompassing both areas below exposed earth and areas below earth covered by water, such as ocean or fresh water.

Referring to FIG. 1, depicted is a perspective view of a well system 100 including an exemplary operating environment that the apparatuses, systems and methods disclosed herein may be employed. For example, the well system 100 could employ a downhole sealing device 170 designed, manufactured and/or operated according to any of the embodiments, aspects, applications, variations, designs, etc. disclosed in the following paragraphs. The well system 100 illustrated in FIG. 1 includes a service rig 110 (e.g., a drilling rig, a completion rig, a workover rig, or other mast structure or combination thereof) extending over and around a wellbore 120 formed in a subterranean formation 130. As those skilled in the art appreciate, the wellbore 120 may be fully cased, partially cased, or an open hole wellbore. In the illustrated embodiment of FIG. 1, the wellbore 120 is partially cased, and thus includes a cased region 140 and an open hole region 145. The cased region 140, as is depicted, may employ casing 150 that is held into place by cement 160.

The well system 100 illustrated in FIG. 1, in accordance with at least one embodiment, includes the downhole sealing device 170 located within the wellbore 120. The downhole sealing device 170 may be supported by a conveyance 190, which can be a wireline, slickline, cable, tubular (e.g. drill string, casing string, completion string, coiled tubing or the like), or other structure suitable for supporting the downhole sealing device 170. In some aspects, the service rig 110 can include a derrick with a rig floor through which the conveyance 190 extends downward from the service rig 110 into the wellbore 120. In an offshore situation, the service rig 110 can be supported by risers or piers extending downwards to a seabed in some implementations. Alternatively, the service rig 110 can be supported by columns sitting on hulls or pontoons (or both) that are ballasted below the water surface, which may be referred to as a semi-submersible platform or rig. In an off-shore location, tubing may extend from the service rig to exclude sea water and contain drilling fluid returns. Other mechanical features that are not shown may control the run-in and withdrawal of the conveyance 190 in the wellbore 120. Examples of these other mechanical features include a draw works coupled to a hoisting apparatus, a slickline unit or a wireline unit including a winching apparatus, another servicing vehicle, or other such mechanisms. The downhole sealing device 170 can be a bridge plug, a packer, or another type of sealing device that may be used downhole. Furthermore, the downhole sealing device 170 may be located in the open hole region 145 of the wellbore 120, or alternatively as a sealant between two downhole tools.

The downhole sealing device 170, in at least one embodiment, may include an elastomeric element 172. In one or more embodiments, the elastomeric element 172 comprises a thiourethane/acrylate polymer that is operable to be compressed within the wellbore 120, for example against a tubular (e.g., the wellbore casing 150 in the embodiment shown), as a seal. The term thiourethane/acrylate polymer, as used herein, is intended to encompass thiourethane polymers, thiolacrylate polymers, and blended combinations of thiourethane polymers and thiolacrylate polymers. Accordingly, in certain embodiments the elastomeric element 172 may comprise a thiourethane polymer, and in other embodiments the elastomeric element 172 may comprise a thiolacrylate polymer. However, in yet certain other embodiments, the elastomeric element 172 may comprise a blend of a thiourethane polymer and a thiolacrylate polymer, for example using various different proportions.

In at least one embodiment, depending on the specific manufacturing process and composition of the elastomeric element 172, the elastomeric element 172 is operable to be compressed within the wellbore 120, for example against a tubular (e.g., the wellbore casing 150 in the embodiment shown), and operable to seal at least 6,900 kPa (e.g., about 1,000 psi) of pressure differential at a temperature of at least 80° C. In another embodiment, the elastomeric element 172 is operable to be compressed within the wellbore 120, for example against a tubular (e.g., the wellbore casing 150 in the embodiment shown), and operable to seal at least 20,700 kPa (e.g., about 3,000 psi) of pressure differential at a temperature of at least 80° C. In yet another embodiment, depending on the specific manufacturing process and com-position of the elastomeric element 172, the elastomeric element 172 is operable to be compressed within the wellbore 120, for example against a tubular (e.g., the wellbore casing 150 in the embodiment shown), and operable to seal at least 20,700 kPa of pressure differential at temperatures as low as −65° C. and as high as 270° C. In other embodiments, the elastomeric element 172 is operable to be compressed within the wellbore 120, for example against the tubular (e.g., the wellbore casing 150 in the embodiment shown), and operable to seal at least 27,575 kPa (e.g., about 4,000 psi) of pressure differential at a temperature of at least 80° C. In at least one or more other embodiments, the elastomeric element 172 is operable to be compressed within the wellbore 120, for example against the tubular (e.g., the wellbore casing 150 in the embodiment shown), and operable to seal at least 27,575 kPa of pressure differential at temperatures as low as −65° C. and as high as 270° C. Furthermore, in at least one or more embodiments, the elastomeric element 172 has a fracture toughness of at least 40 MJ/m$^3$ and a tensile strength of at least 25 MPa. In at least one embodiment, the elastomeric element 172 is susceptible to a high degree of elongation (e.g., up to and at least about 200%)

In at least one embodiment, the downhole sealing device 170 is a first downhole sealing device, and the well system 100 additionally includes a second downhole sealing device 180. In at least this embodiment, the second downhole sealing device 180 may be placed proximate the downhole sealing device 170, for example to complement the downhole sealing device 170. For example, the second downhole sealing device 180 might comprise a material (e.g., polymeric material) different from the thiourethane/acrylate polymer, and thus accommodate applications where the downhole sealing device 170 might be lacking. For example, the second downhole sealing device 180 might have greater pressure ratings at extremely elevated temperatures, wherein it has lesser pressure ratings at lower temperatures.

The elastomeric element 172, in accordance with one embodiment, is coupled to one or more downhole sealing features. For example, in the embodiment of FIG. 1, the one or more downhole sealing features are first and second end plates coupled to opposing ends of the elastomeric element 172, the first and second end plates 174 configured to move with respect to one another to axially compress the elastomeric element 172 to engage the wellbore casing 150. If the downhole sealing device 170 were positioned in the open-hole region 145 of the well system 100, the first and second end plates 174 would axially compress the elastomeric element 172 to engage the wellbore 120 itself. In some cases, the elastomeric element 172 and the first and second end plates 174 are positioned between two anti-extrusion devices 176. As seen in FIG. 1, the downhole sealing device 170 is in an uncompressed state and is able to be moved within the wellbore 120. Once located at a desired position, axial compression forces can be applied to the first and second end plates 174 to axially compress the elastomeric element 172 into a compressed state, as shown in FIG. 2.

Figure 2:
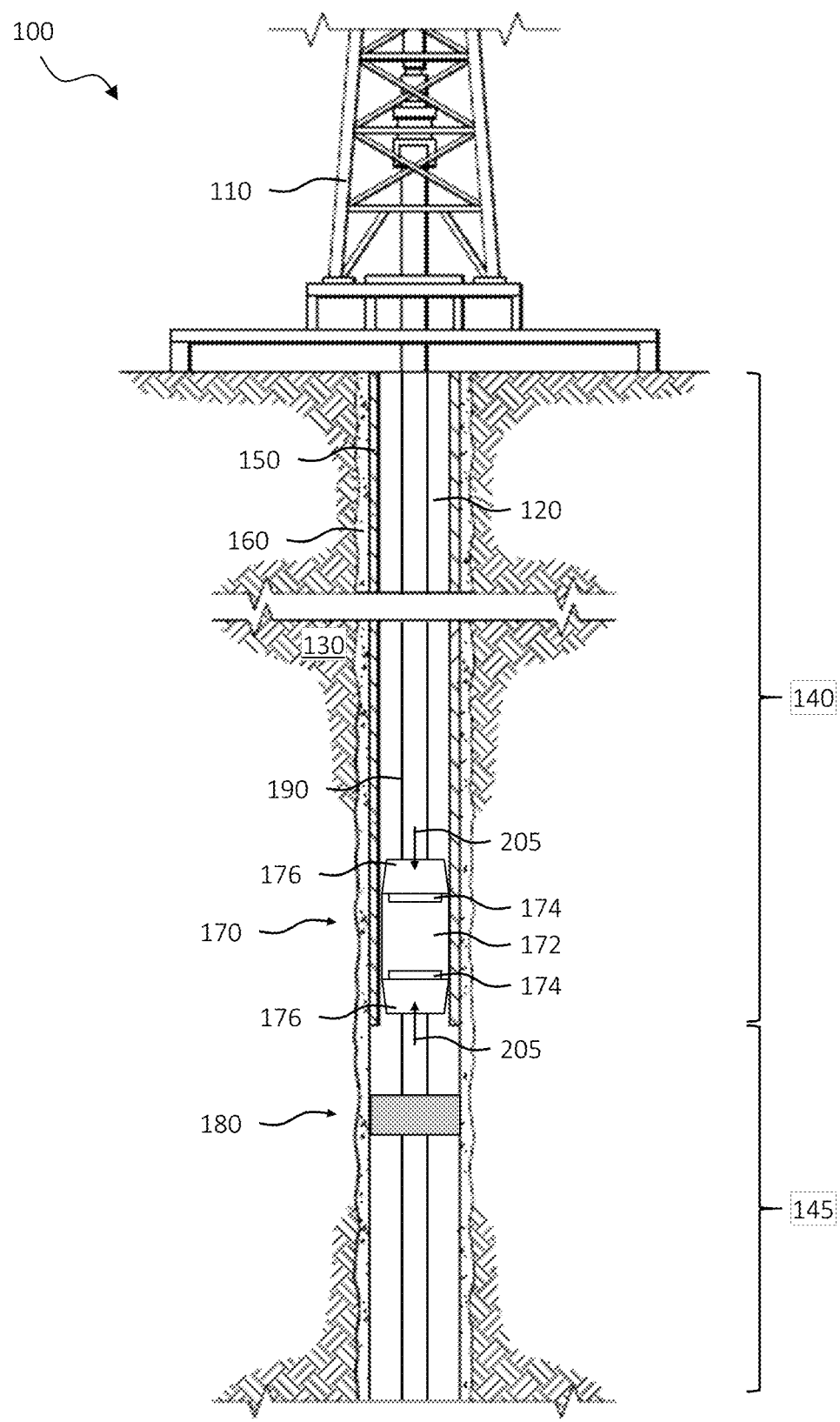

FIG. 2 is a schematic diagram of the well system 100 of FIG. 1 including the downhole sealing device 170 in a compressed state according to certain aspects of the present disclosure. Axially compressive force 205 is applied through the first and second end plates 174 to the elastomeric element 172 to deform the elastomeric element 172 such that the elastomeric element 172 creates a seal in the wellbore 120. In cases where the anti-extrusion devices 176 are used, the axially compressive force 205 can cause the anti-extrusion devices 176 to expand in diameter and provide a surface against which the deformable elastomeric element 172 cannot easily pass (e.g., to prevent the elastomeric element 172 from deforming too far past the end plates 174). In some cases, axially compressive forces 205 can be removed from—or axial extension forces can be applied to (e.g., in a direction opposite the axially compressive forces 205)—the downhole sealing device 170 in order to return the downhole sealing device 170 to an uncompressed state, such as that seen in FIG. 1.

Elastomeric elements designed, manufactured and operated according to the disclosure, without limitation, may be applied to: 1) O rings applications (e.g., from −65° C. to 270° C.) manufactured using 3D printing or other conventional methods; 2) T-seal, stack seal, quad seals, bonded seals or any other seals application (e.g., from −65° C. to 270° C.) manufactured using 3D printing or other conventional methods; 3) ExtremGrip ELH elastomeric components (e.g., from −40° C. to 250° C.) manufactured using 3D printing or other conventional methods; 4) Packer elements with external complex or simple geometric features (e.g., from −65° C. to 270° C.) manufactured using 3D printing or other conventional methods; 5) Packer elements with internal geometric features and with or without external features (e.g., from −65° C. to 270° C.) manufactured using 3D printing methods; 6) Seals for on demand or one-off applications (e.g., from −65° C. to 270° C.) manufactured using 3D printing methods; 7) Legacy seals that are no longer in commercial production (from −65° C. to 270° C.) manufactured using 3D printing methods; 8) Sealing elements bonded directly to a rigid substrate (e.g., from −65° C. to 270° C.) manufactured using 3D printing methods; and 9) Multi-compositional packer elements and bonded sealing systems with crystalline or high Tg regions to serve as integrated backup systems (e.g., from −65° C. to 270° C.) manufactured using 3D printing or other conventional methods. The aforementioned seals can be any type of packers for retrievable, production, permanent packers, for bridge plugs, for plug and abandonment application, for fracking, for on shore or offshore Applications, for conventional and HPHT applications and to certain degree (e.g., up to 270° C.) geothermal applications. Furthermore, the seals can be used statically or dynamically.

All the seals mentioned above and their variations may or may not have backups, for example depending on pressure rating and/or application temperature. Typically for high pressure and/or high temperature, properly designed backups are used, which significantly improve the performance of elements made from this material.

Use of elastomeric elements manufactured according to this disclosure have the added benefits of: reduced part count in high expansion packer/plugs; expansion of the design space to elements with internal geometric features, as well as compositional changes within the part that modify the glass transition and/or crystallinity to affect mechanical behavior allows for 3D printed elements with internal features having a very high expansion ratio (e.g., 150% or 200%, in place of approximately 25%); significantly expand the temperature range of seal applications from −65° C. to 270° C.; improve operational efficiency through on-demand in the field manufacturing of high expansion elements for manufacturers, operators and their customers; potential replacement of common oil and gas elastomers where sour conditions are of concern.

Thiourethane Polymers

As part of the present disclosure, VAT resin additives appropriate for use in the manufacture of thiourethane polymer parts are being used. One embodiment of the disclosure includes a photopolymerizable thiourethane resin for additive manufacturing in an oxygen environment, the resin comprising: a first type of monomer including two or more thiol functional groups; a second type of monomer including two or more isocyanate functional groups; a photolatent base, wherein the photolatent base is decomposable upon exposure to a light to form a non-nucleophillic base catalyst having a pKa greater than 7; an anionic step-growth polymerization reaction inhibitor, the inhibitor having an acidic group configured to form an acid-base pair with the non-nucleophillic base; and a light absorber having an absorbance in the liquid mixture that is greater than an absorbance of the photolatent base at a wavelength of the light used for the exposure.

In at least one embodiment, because thiourethane polymers are cured using a non-nucleophilic Lewis base, free radical initiators and radical or oxygen inhibitors additives developed for use with acrylate based resins may not be appropriate for use with thiourethane polymer manufacturing methods and systems.

As further disclosed herein, embodiments of the VAT resin can include a combination of resin additives including an anionic step-growth polymerization reaction inhibitor (e.g., a cationic inhibitor) and a light absorber. These resin additives may be provided in amounts to reduce or prevent thiourethane polymer photo-polymerization propagation in regions of the VAT resin that are outside of photo-defined development areas, to thereby improve the photo-definition of the thiourethane polymer part.

Therefore, one aspect of the disclosure is a VAT resin for three-dimensional (3D) SLA printing of a thiourethane polymer part (e.g., elastomeric element). Some embodiments of the resin can comprise a liquid mixture that includes a first type of monomer, a second type of monomer, and a photolatent base. The first type of monomer may include two or more thiol functional groups, the second type of monomer may include two or more isocyanate functional groups. The photolatent base decomposes upon exposure to a light to form a non-nucleophillic base catalyst having a pKa greater than 7. The VAT resin may further comprise an anionic step-growth polymerization reaction inhibitor having an acidic group configured to form an acid-base pair with the non-nucleophillic base. The VAT resin may also comprise a light absorber that has an absorbance in the liquid mixture that is greater than an absorbance of the photolatent base in the liquid mixture at a wavelength of the light used for the exposure.

In some embodiments, the VAT resin is substantially free of water (e.g., less than 0.1 wt % or less than 0.01 wt % or less than 0.001 wt % in some embodiments). For instance anhydride or non-hydrated forms of monomers, photolatent base, inhibitor and light absorber are used in the liquid mixture of the resin.

While not limiting the scope of the disclosure by theoretic considerations, it is believed that the storage lifetime of the resin can be decreased by the presence of water, possibly due to the reaction between water and isocyanate functional groups of the second type of monomer to thereby reduce the total number of isocyanate functionalized monomer available to participate in the step-growth polymerization reaction to form the thiourethane polymer part and may form a cyanuric acid byproduct which may degrade the thiourethane polymer part's structure post-cure. Additionally, it is believed that one of the reaction products between the water and isocyanate functional groups may be carbonic acid, which in turn can form a cyanuric anhydride. We further believe that while cyanuric anhydride may extend the polymer chain, when the chain breaks it will release $CO_2$ which in turn may degrade the printed polymer part's structure post-cure.

In some embodiments of the VAT resin, a mole ratio of the photolatent base to the anionic step-growth polymerization reaction inhibitor is in a range from about 5:1 to 15:1, and in some embodiments about 10:1. Such ratios are conducive to allowing the polymerization reaction to proceed in the target region of light illumination where the light causes relatively high concentrations of activated non-nucleophillic base catalyst molecules (e.g., photodecomposed photolatent base molecules) and at the same time still provide enough inhibitor molecules in the non-targeted regions to form acid-base pairs with activated non-nucleophillic base catalyst molecules that have diffused out of the target region.

In some embodiments, the anionic step-growth polymerization reaction inhibitor is a strong organic acid and is non-oxidizing. That is, the inhibitor is substantially completely ionized (e.g., greater than 90% ionized and in some embodiments, greater than 99% ionized) in the liquid mixture of the resin and the inhibitor does not substantially oxidize the thiol functional groups of the first type of monomer in the liquid mixture. Using an anionic step-growth polymerization reaction inhibitor that is a strong acid facilitates the availability of acid groups that can form acid-base pairs with the activated non-nucleophillic base catalyst molecules, e.g., diffused into the non-targeted regions of the resin. Using an anionic step-growth polymerization reaction inhibitor that is non-oxidizing facilitates the storage life of the resin by maintaining the availability of thiol functional groups that can participate in the polymerization reaction.

Non-limiting example embodiments of the anionic step-growth polymerization reaction inhibitor include: octanoic acid, methanesulfonic acid, trifluoromethanesulfonic acid or carboxlic acid. For example in some embodiments, the anionic step-growth polymerization reaction inhibitor of p-toluenesulfonic acid has a concentration in the liquid mixture in a range from about 0.001 to 0.2 wt %, and in some embodiments, in a range from about 0.05 to 0.2 wt %.

In some embodiments, the light absorber in the liquid mixture has an absorbance that is at least about 1 percent higher than the absorbance of the photolatent base at the wavelength of the light that the resin is exposed to. In certain other embodiments, it is 5 percent higher, 10 percent higher, or even 20 percent higher.

Such embodiments are conducive to the photolatent base molecules absorbing enough of the light and thereby be activated non-nucleophillic base catalyst molecules in the target area to catalyze the polymerization reaction and at the same time still permit the light absorber to absorb light scattered into the non-target areas of the resin and thereby reduce the amount light available to activate the photolatent base molecules in the non-target areas.

In some embodiments the light absorber has a high molar extinction coefficient at the wavelength used to activate the photolatent base (e.g., at least about 10000 $M^{-1}$ $cm^{-1}$). Having a high molar extinction coefficient is conducive to using low (e.g., millimolar or lower concentrations) of the light absorber in the fluid mixture of the resin, which in turn is conducive to having the light absorber fully dissolve in the mixture, e.g., to mitigate light scattering effects from partially precipitated light absorbers.

Consider an example where the light absorber is or includes 2,2'-(2,5-thiophenediyl)bis(5-tert-butylbenzoxazole (molar extinction coefficient equal to about 47000 $M^{-1}$ $cm^{-1}$ at about 373 nm) with a concentration in the fluid mixture that is in a range from about 0.001 to 1 wt %. At a concentration of about 1 wt % (e.g., about 23 mM) the absorbance in the fluid mixture would equal about 1080. At a fluid concentration of about 0.01 wt % (e.g., about 0.23 mM) the absorbance in the fluid mixture would equal 10.8 and at a fluid concentration of about 0.001 wt % (e.g., about 0.023 mM) the absorbance in the fluid mixture would equal about 1.08.

Based on the present disclosure one skilled in the pertinent art would appreciate that the light absorber could be molecules selected have a sufficiently high molar extinction coefficient in the UV or in the visible light range to be soluble in the fluid mixture and have an absorbance that is greater than the absorbance of the photolatent base and the wavelength of light that is used to activate the photolatent base.

In some embodiments of the resin, the photolatent base is or includes 5-(2'-(methyl) thioxanthone)-1,5-diazabicyclo[4.3.0]non-5-ene tetraphenylborate. Other non-limiting examples of other photolatent bases could also be used.

In some embodiments, the first type of monomer in the resin is or includes one of more of: 2,2'-(ethylenedioxy) diethanethiol, decanedithiol, hexanedithiol, glycol dimercaptoacetate, glycol dimercaptopropionate, thiobisbenzenethiol, xylene dithiol, pentaerythritol tetramercaptoacetate, pentaerythritol tetramercaptopropionate, dipentaerythritol hexamercaptopropionate, trimethylolpropane trimercaptoacetate, trimethylolpropane trimercaptoacetate, or tris[2-(3-mercaptopropionyloxy)ethyl]isocyanurate.

In some embodiments, the second type of monomer in the resin is or includes one of more of: hexamethylene diisocyanate, trimethylhexamethylene diisocyanate, diisocyanatooctane, isophorone diisocyanate, xylene diisocyanate, toluene diisocyanate, phenylene diisocyanate, bis(isocyanatomethyl)cyclohexane, 4,4'-methylenebis(phenyl isocyanate), 4,4'-methylenebis(cyclohexyl isocyanate), or tris(6-isocyanatohexyl)isocyanurate.

Based upon the present disclosure one skilled in the pertinent arts would appreciate that the amounts of inhibitor and light absorber present in the resin would depend upon the on the amount of the photolatent base initiator present in the resin as well as the absorbance of the photolatent base at the wavelength of light beam used to activate the photolatent base exposure to form the non-nucleophillic base catalyst.

Figure 3:
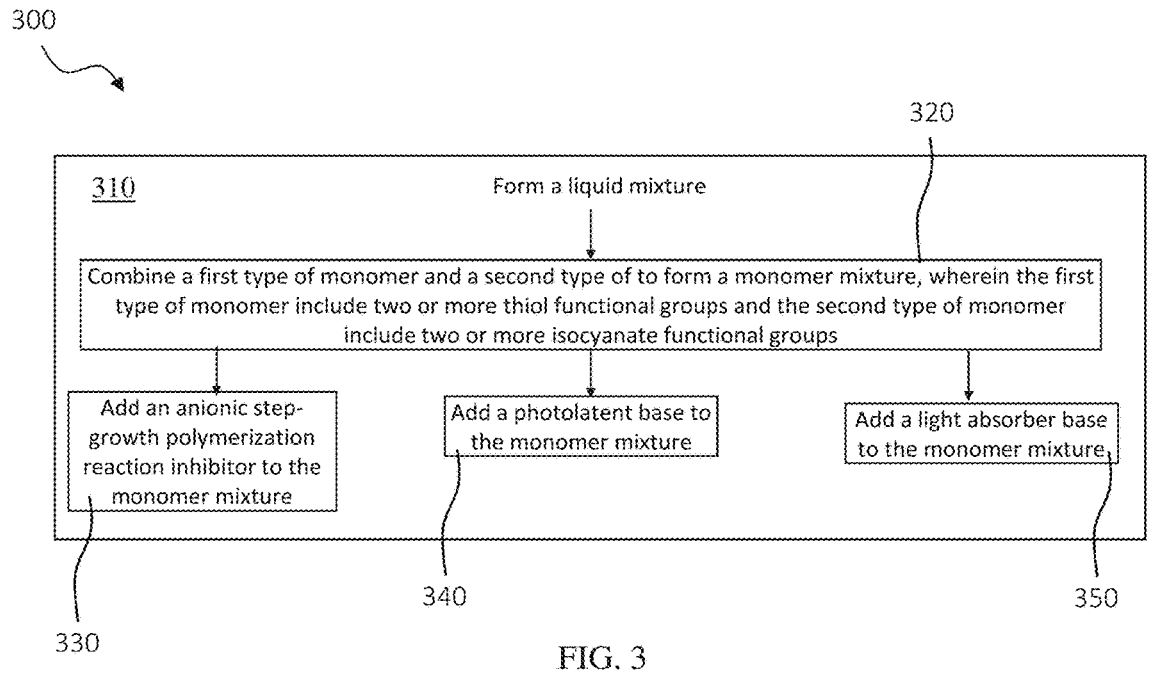
FIG. 3 illustrates one flow diagram of an example method of preparing a VAT resin for a thiourethane polymer in accordance with the principles of the present disclosure.

FIG. 3 illustrates by flow diagram, selected aspects of an example method 300 of preparing a VAT resin for a thiourethane polymer in accordance with the principles of the present disclosure.

With continuing reference to FIG. 3 throughout, some embodiments of the method 300 can comprise forming a liquid mixture (step 310). Forming the liquid mixture (step 310) includes combining a first type of monomer and a second type of monomer to form a monomer mixture (step 320). Any combination of the first and second types of monomers disclosed herein could be mixed together to form a homogenous monomer mixture. For example, the first type of monomer can include two or more thiol functional groups and the second type of monomer can include two or more isocyanate functional groups.

Forming the liquid mixture (step 310) also includes adding an anionic step-growth polymerization reaction inhibitor to the monomer mixture (step 330), e.g., any anionic step-growth polymerization reaction inhibitor that has an acidic group configured to form an acid-base pair with the non-nucleophillic base.

Forming the liquid mixture (step 310) also includes adding a photolatent base to the monomer mixture (step 340), e.g., any disclosed photolatent base that decomposes upon exposure to a light to form a non-nucleophillic base catalyst having a pKa greater than 7.

Forming the liquid mixture (step 310) also includes adding a light absorber to the monomer mixture (step 350), e.g., any light absorber that in the liquid mixture that will have an absorbance that is greater than an absorbance of the photolatent base at a wavelength of the light used for the exposure.

Embodiments of the method 300 can include any combination of sequential additions of the anionic step-growth polymerization reaction inhibitor, the photolatent base and the light absorber to the monomer mixture, or, adding any two or all three of these to the monomer mixture simultaneously to form a homogenous liquid mixture.

Figure 4:
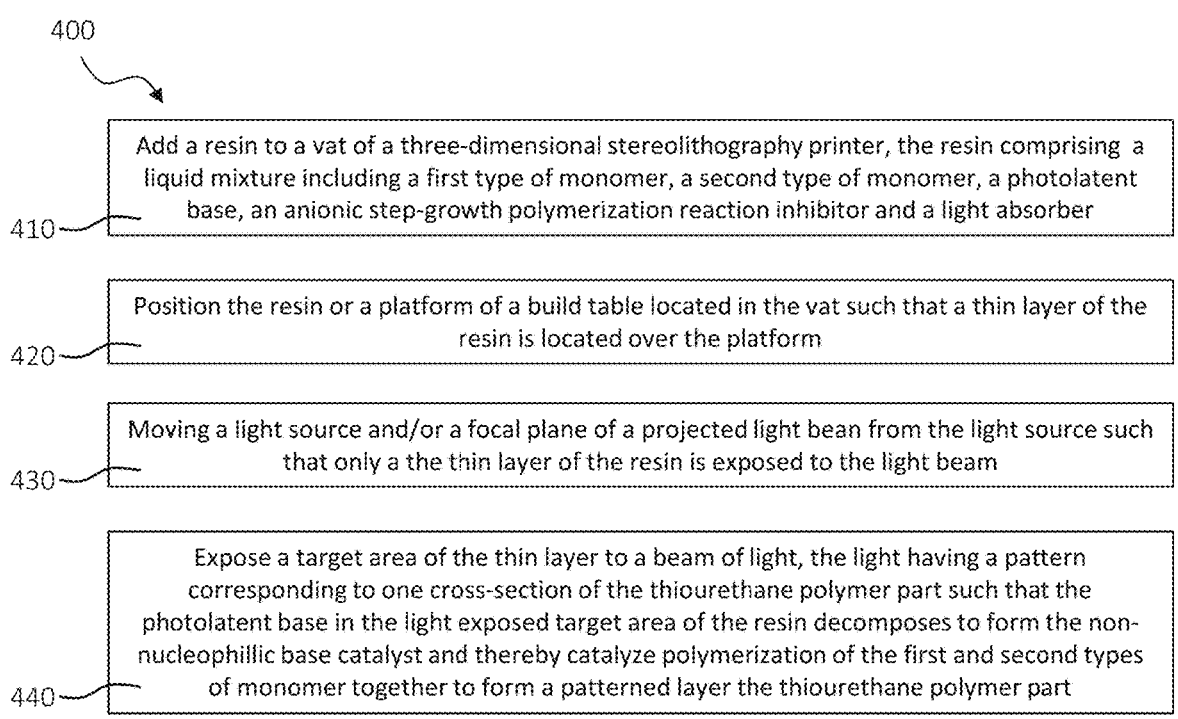
FIG. 4 illustrates one flow diagram of an example method of three-dimensional stereolithography printing a thiourethane polymer part in accordance with the principles of the present disclosure.

FIG. 4 illustrates by flow diagram, selected aspects of an example method 400 of three-dimensional stereolithography printing a thiourethane polymer part in accordance with the principles of the present disclosure.

With continuing reference to FIG. 4 throughout, some embodiments of the method 400 can comprise adding a resin to a vat of a three-dimensional stereolithography printer (step 410). The resin can comprise any of the embodiments of the liquid mixture including the first type of monomer, the second type of monomer, the photolatent base, the anionic step-growth polymerization reaction inhibitor and the light absorber disclosed herein.

Embodiments of the method 400 can also comprise positioning (step 420) the resin or a platform of a build table located in the vat such that a thin layer of the resin is located over the platform.

In some embodiments, as part of positioning (step 420), the build table can be moved to flow a thin layer of the resin (e.g., layer of thickness 100 to 500 microns) on top of a previously cured layer of the part. In other embodiments, as part of positioning (step 420), the amount of liquid platform in the vat can be increased by adding liquid platform to the vat via a pump (e.g., a syringe or peristaltic pump) to raise the level of resin in the vat and thereby to flow a thin layer of the resin on top of the previously cured layer. In some embodiments a portion of the liquid platform can be subtracted from the vat via the pump to lower the level of the resin in the vat but leave the thin layer of resin on top of the previously cured layer.

In yet other embodiments, the light source can be moved and/or the focal plane of the projected light bean can be adjusted such that only the thin layer of the resin is exposed to the light beam (step 430).

Embodiments of the method 400 can also comprise exposing (step 440) a target area of the thin layer to a beam of the light, the light having a pattern corresponding to one cross-section of the thiourethane polymer part such that the photolatent base in the light exposed target area of the resin decomposes to form the non-nucleophillic base catalyst and thereby catalyzes polymerization of the first and second types of monomer together to form a patterned layer the thiourethane polymer part.

In embodiments of the method 400, the inhibitor and light absorber additives in the resin can substantially prevent the polymerization of the first and second types of monomer in areas of the resin lying outside of the target area.

Based on the present disclosure one skilled in the pertinent arts would understand how the process of selectively exposing target areas of successive thin layers of resin to the light beam can be repeated until the final three-dimensional part is formed. The part is then removed from the vat, cleaned, and post-cured.

The liquid thiourethane resins and additives could, either now or possibly in the future, be purchased from the manufacturer Adaptive3D in Plano, Tex.

Thiolacrylate Polymers

As part of the present disclosure, VAT resin additives appropriate for use in the manufacture of thiolacrylate polymer parts are being used. One embodiment of the disclosure includes a photopolymerizable thiolacrylate resin for additive manufacturing in an oxygen environment, the resin comprising: a crosslinking component; at least one monomer and/or oligomer; and a chain transfer agent comprising at least one of a thiol, a secondary alcohol, and/or a tertiary amine, wherein the resin may be configured to react by exposure to light to form a cured material.

The crosslinking component may include any compound that reacts by forming chemical or physical links (e.g., ionic, covalent, or physical entanglement) between the resin components to form a connected polymer network. The crosslinking component may include two or more reactive groups capable of linking to other resin components. For example, the two or more reactive groups of the crosslinking component may be capable of chemically linking to other resin components. The crosslinking component may include terminal reactive groups and/or side chain reactive groups. The number and position of reactive groups may affect, for example, the crosslink density and structure of the polymer network.

The two or more reactive groups may include an acrylic functional group. For example, a methacylate, acrylate or acrylamide functional group. In some cases, the crosslinking component includes a difunctional acrylic oligomer. For example, the crosslinking component may include an aromatic urethane acrylate oligomer or an aliphatic urethane acrylate oligomer. The crosslinking component may include at least one of CN9167, CN9782, CN9004, polyethylene glycol) diacrylate, bisacrylamide, tricycle $[5.2.1.0^{2,6}]$ decanedimethanol diacrylate, and/or trimethylolpropane triacrylate. The size of the crosslinking component may affect, for example, the length of crosslinks of the polymer network.

The number of crosslinks or crosslink density may be selected to control the properties of the resulting polymer network. For example, polymer networks with fewer crosslinks may exhibit higher elongation, whereas polymer networks with greater crosslinks may exhibit higher rigidity. This may be because the polymer chains between the crosslinks may stretch under elongation. Low crosslink-density chains may coil up on themselves to pack more tightly and to satisfy entropic forces. When stretched, these chains can uncoil and elongate before pulling on crosslinks, which may break before they can elongate. In highly cross-linked materials, the high number of crosslinked chains may lead to little or no uncoilable chain length and nearly immediate bond breakage upon strain.

The amount of the crosslinking component may be selected to control the crosslink density and resulting properties of the polymer network. In some cases, the crosslinking component is 1-95% by weight of the resin. In other cases, the crosslinking component is >1%, 1.0-4.99%, 5-10% or about 20%, 30%, 40%, 50%, 60%, 70%, 80%, or 90% by weight of the resin. [46] In some cases, the resin includes at least one monomer and/or oligomer. In some embodiments, the at least one monomer and/or oligomer is 1-95% by weight of the resin. In other cases, the at least one monomer and/or oligomer is >1%, 1.0-4.99%, 5-10% or about 20%, 30%, 40%, 50%, 60%, 70%, 80%, or 90% by weight of the resin. The monomer may include small molecules that combine with each other to form an oligomer or polymer. The monomer may include bifunctional monomers having two functional groups per molecule and/or polyfunctional monomers having more than one functional group per molecule. The oligomer may include molecules consisting of a few monomer units. For example, in some cases, the oligomer may be composed of two, three, or four monomers (e.g., dimer, trimer, or tetramer). The oligomer may include bifunctional oligomers having two functional groups per molecule and/or polyfunctional oligomers having more than one functional group per molecule.

The at least one monomer and/or oligomer may be capable of reacting with the other resin components to form a connected polymer network. For example, the at least one monomer and/or oligomer may include one or more functional groups capable of reacting with the two or more reactive groups of the crosslinking component. The at least one monomer and/or oligomer may include an acrylic functional group. For example, a methacylate, acrylate or acrylamide functional group.

In some cases, at least one monomer and/or oligomer includes one or more monomers. For example, the one or more monomers may be about 1-95% by weight of the resin. Or, the resin may comprise at least about 50% or at least about 60% of one or more monomers. In other cases, at least one monomer and/or oligomer includes an acrylic monomer. The acrylic monomer may have a molecular weight less than 200 Da, less than 500 Da, or less than 1,000 Da. The acrylic monomer may include at least one of 2-ethylhexyl acrylate, hydroxypropyl acrylate, cyclic trimethylolpropane formal acrylate, isobornyl acrylate, butyl acrylate, and/or N,N'-Dimethylacrylamide.

Chain transfer agents may include any compound that possesses at least one weak chemical bond that potentially reacts with a free-radical site of a growing polymer chain and interrupts chain growth. In the process of free radical chain transfer, a radical may be temporarily transferred to the chain transfer agent which reinitiates growth by transferring the radical to another component of the resin, such as the growing polymer chain or a monomer. The chain transfer agent may affect kinetics and structure of the polymer network. For example, the chain transfer agent may delay formation of the network. This delayed network formation may reduce stress in the polymer network leading to favorable mechanical properties.

In some cases, the chain transfer agent may be configured to react with an oxygen radical to initiate growth of at least one new polymer chain and/or reinitiate growth of a polymer chain terminated by oxygen. For example, the chain transfer agent may include a weak chemical bond such that the radical may be displaced from the oxygen radical and transferred to another polymer, oligomer or monomer.

Additive manufacturing processes, such as 3D printing, may produce three dimensional objects by sequentially curing layers of a photopolymerizable resin. Thus, articles produced by additive manufacturing may comprise a majority or plurality of photocured layers. Additive manufacturing may be performed in an oxygen environment, wherein oxygen may diffuse into a deposited layer of resin.

In some cases, an oxygen radical may be formed by a reaction of diffused oxygen with a growing polymer chain. For example, at the oxygen-rich surface of a layer of resin, oxygen may react with initiator radicals or polymer radicals to form an oxygen radical. The oxygen radical may be affixed to a polymer side chain. Oxygen radicals, for example, peroxy radicals, may slow down curing of the resin. This slowed curing may lead, for example, to the formation of a thin, sticky layer of uncured monomers and/or oligomers at the oxygen-rich surface of a previously cured layer of resin, which would otherwise minimize adhesion to an adjacent subsequently cured layer of resin.

Due at least in part to the presence of a chain transfer agent, at least some bonding between a layer of resin previously cured and an adjacent, subsequently cured layer of resin, may occur despite an oxygen-rich surface present on the previously cured layer of resin at an interface between the previously cured layer of resin and the subsequently cured layer of resin. In some cases, the bonding may be covalent. In some embodiments, the bonding may be ionic. In some cases, the bonding may be physical entanglement of polymer chains. Additionally, in some cases, the chain transfer agent is ½-50% by weight of resin. In some cases the chain transfer agent is about 0.5-4.0%, 4.0-4.7%, 4.7-4.99%, 4.99-5%, or 5-50% by weight of the resin.

The thiolacrylate polymer resin materials may exhibit excellent interlayer strength when 3D printed in air environments. Because three-dimensional prints are built layer by layer, when printing in open-air, each resin layer will have an opportunity (e.g., during patterning) to become enriched with oxygen at its surface exposed to air. With prior resins, this oxygen enrichment resulted in weak adhesion between layers because the oxygen available at the oxygen-rich interfaces between layers inhibited free-radical polymerization, thereby limiting chain growth and retarding the reaction. The thiolacrylate polymer resins, however, include a chain transfer agent (e.g., a secondary thiol) that may overcome this problem and promote the chemical and physical crosslinking between 3D printed layers even in the presence of elevated or ambient oxygen levels at the interfaces between layers.

Further, the thiolacrylate polymer resin materials may demonstrate lower sensitivity to oxygen. In free-radical polymerization systems, oxygen reacts with primary initiating or propagating radicals to form peroxy radicals. In prior resins, these peroxy radicals would tend to terminate polymerization. In the thiolacrylate polymer resins, however, thiols may act as a chain transfer agent allowing for further propagation of the polymerization reaction. Lower sensitivity to oxygen may enable open-air manufacturing processes without the expense of reduced-oxygen manufacturing (e.g., a nitrogen or argon blanket).

The thiolacrylate polymer resin may undergo a chain transfer reaction during photocuring. Chain transfer is a reaction by which the free radical of a growing polymer chain may be transferred to a chain transfer agent. The newly formed radical then reinitiates chain growth. It is thought that the chain transfer reaction may reduce stress in materials formed from thiolacrylate polymer resins, among other benefits.

In some cases, the chain transfer agent may be configured to transfer a radical from a first polymer chain or chain branch within the previously cured resin layer to a second polymer chain or chain branch within the volume of the photopolymerizable resin. This may, for example, enable formation of chemical or physical crosslinks between adjacent photocured layers in an article produced by additive manufacturing. In other cases, the chain transfer agent may be configured to promote growth of at least one new polymer chain near the oxygen-rich surface present on the previously cured layer of resin. This too may, for example, enable formation of chemical or physical crosslinks between adjacent photocured layers in an article produced by additive manufacturing. Further, the thiolacrylate polymer resin may include a monomer or oligomer with a side chain able to cooperate with the chain transfer agent to affect the chain transfer mechanism.

The chain transfer agent may comprise at least one of a thiol, a secondary alcohol, and/or a tertiary amine. The secondary alcohol may include at least one of isopropyl alcohol, and/or hydroxypropyl acrylate. In some cases, the thiol is about 0.5% to 4.0%, 4.0% to 4.7%, 4.7% to 4.99%, 4.99-5%, or 5-50% by weight of the resin. The thiol may include a secondary thiol. The secondary thiol may include at least one of Pentaerythritol tetrakis (3-mercaptobutylate): 1,4-bis (3-mercaptobutylyloxy) butane; and/or 1,3,5-Tris(3-melcaptobutyloxethyl)-1,3,5-triazine. The tertiary amine may include at least one of aliphatic amines, aromatic amines, and/or reactive amines. The tertiary amine may include at least one of triethyl amine, N,N'-Dimethylaniline, and/or N,N'-Dimethylacrylamide.

Any suitable additive compounds may be optionally added to the resin. For example, the resin may further comprise polyethylene glycol). The resin may further comprise polybutadiene. The resin may further comprise polydimethylsiloxane acrylate. The resin may further comprise copolymer poly (styrene-co-maleic anhydride).

The resin may further comprise a photoinitiator, an inhibitor, a dye, and/or a filler. The photoinitiator may be any compound that undergoes a photoreaction on absorption of light, producing a reactive free radical. Therefore, photoinitiators may be capable of initiating or catalyzing chemical reactions, such as free radical polymerization. The photoinitiator may include at least one of Phenylbis(2,4,6-trimethylbenzoyl)phosphine oxide, Diphenyl(2,4,6-trimethylbenzoyl)phosphine oxide, Bis-acylphosphine oxide. Diphenyl (2,4,6-trimethylbenzoyl)phosphine oxide, and/or 2,2'-Dimethoxy-2-phenylacetophenone. In some cases, the photoinitiator is 0.01-3% by weight of the resin.

The inhibitor may be any compound that reacts with free radicals to give products that may not be able to induce further polymerization. The inhibitor may include at least one of Hydroquinone, 2-methoxyhydroquinone, Butylated hydroxytoluene, Diallyl Thiourea. and/or Diallyl Bisphenol A.

The dye may be any compound that changes the color or appearance of a resulting polymer. The dye may also serve to attenuate stray light within the printing region, reducing unwanted radical generation and overcure of the sample. The dye may include at least one of 2,5-Bis(5-tert-butyl-benzoxazol-2-yl)thiophene, Carbon Black, and/or Disperse Red 1.

The filler may be any compound added to a polymer formulation that may occupy the space of and/or replace other resin components. The filler may include at least one of titanium dioxide, silica, calcium carbonate, clay, aluminosilicates, crystalline molecules, crystalline oligomers, semi-crystalline oligomers, and/or polymers, wherein said polymers are between about 1,000 Da and about 20,000 Da molecular weight.

The resin viscosity may be any value that facilitates use in additive manufacturing (e.g., 3D printing) of an article. Higher viscosity resins are more resistant to flow, whereas lower viscosity resins are less resistant to flow. Resin viscosity may affect for example, printability, print speed or print quality. For example, the 3D printer may be compatible only with resins having a certain viscosity. Or, increasing resin viscosity may increase the time required to smooth the surface of the deposited resin between print layers because the resin may not settle out as quickly.

The thiolacrylate polymer resin of the disclosed materials may also possess a high cure rate and low viscosity. Additive manufactured objects are created by building up materials layer-by-layer. Each layer is built by depositing liquid resin and applying light to photocure. The viscosity and cure rate of the resin, therefore, affect print speed. A low viscosity resin will quickly spread (e.g., 1-30 seconds) into a flat layer, without the need to apply heat or mechanically manipulate the layer. The spread can be faster (e.g., 1-10 seconds) with mechanical manipulation. Additionally, lower viscosity may allow faster movement of the recoating blade. The faster the cure rate, the more quickly a next, subsequent layer can be built.

The resin viscosity may be tuned, for example, by adjusting the ratio of monomers to oligomers. For example, a resin having higher monomer content may exhibit a lower viscosity. This may be because the lower molecular weight monomers are able to solvate the oligomers, decreasing oligomer-oligomer interactions and thus decreasing the overall resin viscosity. The resin may have a viscosity at or above room temperature of less than about 250 centipoise, less than about 500 centipoise, less than about 750 centipoise, or less than about 1,000 centipoise. In some cases, the resin has a viscosity at a temperature between 0° C. and 80° C. of less than about 1000 centipoise, less than about 500 centipoise, or less than about 100 centipoise.

An article may be made from the resin as described in any embodiment. The article may be made by cast polymerization or additive manufacturing processes, such as 3D printing. The article may include footwear midsole, a shape memory foam, an implantable medical device, a wearable article, an automotive seat, a seal, a gasket, a damper, a hose, and/or a fitting. An article may be made having a majority of layers comprising the resin as described in any embodiment.

In some embodiments, an article may be made from the resin as described in any embodiment further includes a surface coating. The surface coating may be applied to an article for potentially obtaining desired appearance or physical properties of said article. The surface coating may comprise a thiol. The surface coating may comprise a secondary thiol. The surface coating may comprise an alkane. The surface coating may comprise a siloxane polymer. The surface coating may comprise at least one of semi-fluorinated poly ether and/or per-fluorinated poly ether.

In some embodiments, the photoinitiator may be configured to generate a free radical after exposure to light. In some embodiments, the crosslinking component and the at least one monomer and/or oligomer are configured to react with the free radical to provide growth of at least one polymer chain radical within a volume of the photopolymerizable resin. In some embodiments, the at least one polymer chain radical reacts with diffused oxygen to provide an oxygen radical. In some embodiments, the chain transfer agent may be configured to transfer the oxygen radical to initiate growth of at least one new polymer chain radical.

In some embodiments, the crosslinking component and the at least one monomer and/or oligomer are configured to react to provide one or more polymer chains after exposure to light. In some embodiments, the chain transfer agent may be configured to transfer a free radical associated with the one of the polymer chains to another one of the polymer chains.

In some embodiments, the photoinitiator may be configured to generate a free radical after exposure to light wherein the free radical initiates a chain reaction between the crosslinking component and the at least one monomer and/or oligomer to provide one or more polymer chains within a volume of the photopolymerizable resin. In some embodiments, the chain transfer agent may be configured to reinitiate the chain reaction to provide one or more new polymer chains within a volume of the photopolymerizable resin.

The cure rate of resin layers may depend on the tendency of the resin components to polymerize by free radical reactions during curing by a light source (e.g., an ultraviolet light). The resin may optionally comprise a photoinitiator or inhibitor that may be used to speed or retard the curing process. A layer of resin of the disclosure, when provided in a thickness suitable for 3D printing or other additive manufacturing, may be able to photocure in time lengths desired for efficient production of an article. For example, in some cases, a layer of the resin about 100 mm thick may be configured to form a cured material in no more than 30 seconds, no more than 20 seconds, no more than 10 seconds, no more than 3 seconds, no more than 1 second, or no more than 1/10 of a second. In other cases, a layer of the resin about 400 mm thick may be configured to form a cured material in no more than 1 second. In other cases, a layer of the resin about 300 mm thick may be configured to form a cured material in no more than 1 second. In other cases, a layer of the resin about 200 mm thick may be configured to form a cured material in no more than 1 second. In other cases, a layer of the resin about 1000 mm thick may be configured to form a cured material in no more than 30 seconds. In other cases, a layer of the resin about 10 mm thick may be configured to form a cured material in no more than 2 seconds, no more than 1 seconds, no more than ½ a second, or no more than ¼ of a second.

Another embodiment of the disclosure includes a photopolymerizable resin for additive manufacturing, the resin comprising: at least at least one monomer and/or oligomer, and less than about 5% of a thiol, wherein the resin may be configured to react by exposure to light to form a cured material. In some cases, the resin may be configured to form a cured material in an aerobic environment.

Although thiols have a bad odor, the thiolacrylate resin may have little to no discernable smell. It is thought that the low-smell characteristic results, at least in part, from the use of high molecular weight thiols in less than stoichiometric amounts to reduce or eliminate thiol odor. Further, the thiol may become almost completely incorporated into the polymer network.

Thiol volatiles may result from cured materials or during manufacturing processes that use thiols. The thiol volatiles may be tailored to be below thresholds detectable to human scent. This may be achieved, for example, by the resin comprising less than about 5% of a thiol. Thiol volatiles may be measured in a sample by use of a gas chromatography mass spectrometer (GC-MS). In some cases, the cured material contains less than 1 part per 100 million of thiol volatiles at ambient temperature and pressure over 50 seconds in an oxygen environment. In some cases, the cured material contains less than 1 part per 10 billion of thiol volatiles at ambient temperature and pressure over 50 seconds in an oxygen environment. In some cases, the cured material contains less than 1 part per 1 billion of thiol volatiles at ambient temperature and pressure over 50 seconds in an oxygen environment. In some embodiments, the cured material contains less than 1 part per 10 billion of thiol volatiles at ambient temperature and pressure over 50 seconds in an oxygen environment.

The at least one monomer and/or oligomer and the thiol used for additive manufacturing may be any monomer and/or oligomer or thiol compound as described for the resin of the disclosure. For example, the at least one monomer and/or oligomer includes an alkene, an alkyne, an acrylate or acrylamide, methacrylate, epoxide, maleimide, and/or isocyanate.

In some cases, the thiol has a molecular weight greater than about 200 or greater than about 500. In some embodiments, the thiol has a molecular weight greater than about 1 and contains moieties including hydrogen bond acceptors and/or hydrogen bond donors, wherein said moieties undergo hydrogen bonding.

In some cases, the resin includes the thiol and the at least one monomer and/or oligomer in about a stoichiometric ratio. In other embodiments, the thiol is less than about 20% by weight of the resin, less than about 10% by weight of the resin, or less than about 5% by weight of the resin.

In other cases, the thiol includes an ester-free thiol. In some embodiments, the thiol includes a hydrolytically stable thiol. In some embodiments, the thiol includes a tertiary thiol.

The cure rate may be such that a layer of the photopolymerizable resin about 100 mm thick is configured to cure in no more than 30 seconds. The materials may have a strain at break greater than 100%, up to 1000%. The materials have a toughness of between about 30 MJ/m$^3$ and about 100 MJ/m$^3$.

In some embodiments, the resin comprises at least about 50% of one or more acrylic monomers and about 0-45% of one or more acrylic-functionalized oligomers. The thiolacrylate resin can be stored as a single pot system at room temperature.

In some cases, the components of the resin can be combined and stored in a single pot (e.g., a suitable container for chemical storage) for at least 6 months at room temperature with no more than 10-20% increase in the viscosity of the resin. In some cases, the components of the resin mixture can be combined and stored in a single pot for at least 6 months at room temperature with no more than 2%, 5%, 10%, 25%, 50% or 100% increase in the viscosity of the resin.

Stabilized thiols may be any thiol that exhibits fewer ambient thermal reactions (e.g., nucleophilic substitution with monomers or oligomers) compared to other thiols. In some cases, the stabilized thiol includes a bulky side chain. Such bulky side chains may include at least one chemical group, such as a C1-C18 cyclic, branched, or straight alkyl, aryl, or heteroaryl group. In some cases, the stabilized thiol includes a secondary thiol. In other cases, the stabilized thiol includes a multi-functional thiol. In some cases, the stabilized thiol includes at least one of a difunctional, trifunctional, and/or tetra functional thiol. In some embodiments, the stabilized thiol includes at least one of a Pentaerythritol tetrakis (3-mercaptobutylate); and/or 1,4-bis (3-mercaptobutylyloxy) butane.

The thiolacrylate polymer resin may demonstrate improved shelf-stability. Resin compositions containing thiols and non-thiol reactive species such as -enes and acrylates may undergo a dark reaction (e.g., an ambient thermal free-radical polymerization or Michael Addition), which reduces the shelf-life of these compositions. To account for lower shelf-life of these resins, they may either be stored under cold conditions or as a two-pot system. By contrast, thiolacrylate resins such as those of the disclosed materials may include a stabilized thiol (e.g., a secondary thiol). The stabilized thiol may have decreased reactivity, which can potentially increase the shelf-life of 3D printable resin compositions and enable storage as a single-pot resin system at room temperature. Moreover, the resin remaining at completion of a 3D printing run may be reused in a subsequent run.

In some embodiments, the components of the resin mixture can be combined and stored in a single pot for at least 6 months at room temperature with no more than 10% increase in the viscosity of the resin. The increased shelf life, pot life and/or print life may be due, at least in part, to the presence of a stabilized thiol in the resin mixture. Resin compositions containing thiols and non-thiol reactive species, for example acrylates, can undergo a dark reaction (e.g. ambient thermal free-radical polymerizations or nucleophilic Michael additions). The stabilized thiol, however, may have reduced reactivity in the dark reaction.

In some cases, the resin may be configured for continuous use in a 3D printing operation in an air environment for a period of 2 weeks without an increase in viscosity of more than 2%, 5%, 10%, 25, 50% or 100% increase in the viscosity of the resin. In some cases, the resin may be configured for continuous use in a 3D printing operation in an air environment for a period of 4 weeks without an increase in viscosity of more than 2%, 5%, 10%, 25, 50% or 100% increase in the viscosity of the resin. In some cases, the resin may be configured for continuous use in a 3D printing operation in an air environment for a period of 10 weeks without an increase in viscosity of more than 2%, 5%, 10%, 25%, 50%, or 100% increase in the viscosity of the resin. In some cases, the resin may be configured for continuous use in a 3D printing operation in an air environment for a period of 26 weeks without an increase in viscosity of more than 2%, 5%, 10%, 25%, 50%, or 100% increase in the viscosity of the resin. In some cases, the resin may be configured for continuous use in a 3D printing operation in an air environment for a period of 1 year without an increase in viscosity of more than 2%, 5%, 10%, 25%, 50%, or 100% increase in the viscosity of the resin.

In other cases, the at least one monomer and/or oligomer includes one or more acrylic monomers. In some embodiments, the one or more acrylic monomers are at least about 50% by weight of the resin. In other cases, the resin comprises less than about 5% of a stabilized thiol comprising one or more thiol functional groups, wherein the stabilized thiol may be configured to inhibit a nucleophilic substitution reaction between the one or more thiol functional groups and the one or more monomers or oligomers.

Other embodiments of the disclosure may include a photopolymerizable resin for additive manufacturing, the resin comprising: less than about 5% of a thiol, at least about 50% of one or more monomers; wherein the resin may be configured to react by exposure to light to form a cured material, wherein the cured material has a toughness in the range about 3-100 MJ/m$^3$ and a strain at break in the range about 30-1000%.

The cured thiolacrylate resin may further exhibit time temperature superposition, so its properties change with temperature and frequency. At temperatures below the glass transition onset, the material is glassy and brittle. But, at temperatures above onset, the material may become viscoelastic and tough until the offset of the glass transition. The thiolacrylate resin may have a glass transition temperature near use temperature. For example, the resin may have an onset of $T_g$ near 20° C.

At temperatures above the onset of $T_g$, the thiolacrylate resin can be a high strain, tough material. Specifically, the cured thiolacrylate resin exhibits a toughness of between 3-100 MJ/m$^3$ and strain at failure between 30-800%.

The cured materials in the present disclosure may provide mechanical properties that are tough and flexible (measured, e.g., by percent strain at break) that may be suitable for use in manufactured articles in which these properties are desired (e.g., shoe midsoles, insoles, outsoles). Articles comprising these cured materials may thus be produced at reduced expense with more possible efficiency and customizability of article designs and mechanical properties in an additive manufacturing process. For example, customization of toughness and flexibility may be demonstrated in the cured resins materials disclosed above.

Due to the materials properties of the thiolacrylate resin, articles 3D printed from the resin may be used in a variety of applications. Specific applications may include mattresses, game pieces and other at-home widgets, as well as articles worn on the body, or used in the body or car. The resin may also be suitable for form and fit prototypes. For example, the resin may be used to produce low-cost shoe soles (midsoles, insoles, outsoles) for test manufacturing. In another embodiment, the resin, over a broad temperatures range (e.g. 0° C. to 80° C.), has a toughness of between 3 and 100 MJ/m$^3$ and strain at failure between 200 and 1000%. Articles 3D printed from the resin may be used in a variety of applications. Specific applications may include seals, gaskets, hoses, dampers, midsoles, car parts, aerospace components. It may also be suitable for form, fit and function prototypes. For example, it may be used to produce low-density, engineered shoe soles (midsoles, insoles, outsoles) for full-scale manufacturing.

Specifically, toughness may be customized by controlling the percentage and type of monomers with optional combination of additional oligomers, fillers, and additives. Control of these parameters may allow specific design of the materials elongation capacity (strain) and the force at which this elongation occurs (stress). Taken together, the stress/strain behavior of a material may impact its fracture toughness. In some cases, the cured material has a toughness of about 3 MJ/m$^3$. In some cases, the cured material has a toughness of about 5 MJ/m$^3$. In some cases, the cured material has a toughness of about 10 MJ/m$^3$. In some cases, the cured material has a toughness of about 15-25 MJ/m$^3$. In some cases, the cured material has a toughness of about 30-100 MJ/m$^3$.

Additionally, the strain at break may be customized by controlling the percentage and type of monomers with optional combination of additional oligomers, fillers, and additives. Control of the underlying network morphology, the density between crosslinks, and the tear strength of the material (enabled by filler and matrix-filler interactions) may allow control over the elongation (strain) of the material. In some cases, the cured material has a strain at break of about 100%. In some cases, the cured material has a strain at break of about 200%. In some cases, the cured material has a strain at break of about 300%. In some cases, the cured material has a strain at break of about 400%. In some cases, the cured material has a strain at break of about 500%. In some cases, the cured material has a strain at break of about 600%. In some cases, the cured material has a strain at break of about 700%. In some cases, the cured material has a strain at break of about 800%.

In specific cases, the cured material has a toughness in the range about 3-30 MJ/m$^3$ and a strain at break ranging in the range about 30-300%. In other cases, the cured material has a toughness in the range about 8-15 MJ/m$^3$. In some cases, the cured material has a toughness less than about 1 MJ/m$^3$. In some cases, the cured material has a strain at break in the range about 50-250%. In some cases, the cured material has a glass transition temperature in the range about 10-30° C. In other cases, the resin has a toughness in the range about 3-100 MJ/m$^3$ and a strain at break in the range about 200-1000%. In some cases, the cured material has a toughness in the range about 3-8 MJ/m$^3$. In some cases, the cured material has a strain at break in the range about 350-500%. In some cases, the cured material has a toughness in the range about 3-30 MJ/m$^3$ at about 20° C. In other cases, the cured material has a toughness of about 10 MJ/m$^3$ at about 20° C. In some embodiments, the cured material has a strain at break in the range about 30-100% at about 20° C.

In some cases, the cured material has a glass transition temperature in the range about 10-30° C. In some cases, the cured material has a Shore A hardness of about 95 at about 20° C. In some cases, the cured material has a toughness in the range about 1-5 MJ/m$^3$ at about 20° C. In specific cases, the cured material has a toughness of about 3 MJ/m$^3$ at about 20° C.

In specific cases, the cured material has a toughness in the range about 20-40 MJ/m$^3$ at about 20° C. In other cases, the cured material has a toughness of about 40 MJ/m$^3$ at about 0° C. In other cases, the cured material has a toughness of about 30 MJ/m$^3$ at about 20° C. In other embodiments, the cured material has a toughness of about 20 MJ/m$^3$ at about 40° C. In other embodiments, the cured material has a toughness of about 1 MJ/m$^3$ at about 80° C.

In some cases, the cured material has a strain at break in the range about 250-300% at about 0° C. In some embodiments, the cured material has a strain at break in the range about 400-500% at about 20° C. In some cases, the cured material has a strain at break in the range about 400-500% at about 40° C. In some embodiments, the cured material has a strain at break in the range about 275-375% at about 80° C. In some embodiments, the cured material has a glass transition temperature in the range about 35-55° C.

The cure rate of resin layers may depend on the tendency the resin components to polymerize by free radical reactions during curing by a light source (e.g., an ultraviolet light). The resin may optionally comprise a photoinitiator or inhibitor that may be used to speed or retard the curing process. A layer of resin of the disclosure, when provided in a thickness suitable for 3D printing or other additive manufacturing, may be able to photocure in time lengths desired for efficient production of an article. The cure rate may be such that a layer of the photopolymerizable resin about 100 mm thick is configured to cure in no more than 30 seconds. For example, in some cases, a layer of the resin about 100 mm thick may be configured to form a cured material in no more than 30 seconds, no more than 20 seconds, no more than 10 seconds, no more than 3 seconds, no more than 1 second, or no more than 1/10 of a second. In other cases, a layer of the resin about 400 mm thick may be configured to form a cured material in no more than 1 second. In other cases, a layer of the resin about 300 mm thick may be configured to form a cured material in no more than 1 second. In other cases, a layer of the resin about 200 mm thick may be configured to form a cured material in no more than 1 second. In other cases, a layer of the resin about 1000 mm thick may be configured to form a cured material in no more than 30 seconds. In other cases, a layer of the resin about 10 mm thick may be configured to form a cured material in no more than 2 seconds, no more than 1 seconds, no more than 1/2 a second, or no more than 1/4 of a second.

The cured material may also have a desired hardness suitable for manufactured articles. In some cases, the cured material has a Shore A hardness of about 30 at about 20° C. In some cases, the cured material has a Shore A hardness of about 90 at about 20° C.

The glass transition temperature ($T_g$) of the cured material is the temperature at which a polymer goes from an amorphous rigid state to a more flexible state. The glass transition temperature of the cured material may be customized by controlling the percentage and type of monomer, the percentage and type of oligomer, filler, plasticizer and curing additives (e.g., dye initiator, or inhibitor). In some cases, the cured material has a glass transition temperature in the range about 10° C. to about −30° C. In some embodiments, the cured material has a glass transition temperature with a full width half max of more than 20° C., more than 30° C., more than 40° C., or more than 50° C. In specific cases the cured material has a glass transition temperature with a full width half max of more than 50° C.

Additionally, the cured material is in a glassy state below the glass transition temperature, and the cured material is in a tough state above the glass transition temperature. In some cases, a tough state occurs in the range about 5-50° C. In some cases, the tough state occurs in the range about 20-40° C. In some cases, the resin has a glass transition temperature is in the range about 20-25° C.

The materials may have a strain at break greater than 100%, up to 100%. The materials may have a toughness of between about 30 MJ/m$^3$ and about 0) MJ/m$^3$. In specific cases, the cured material has a strain at break in the range about 400-500% at about 20° C. In some cases, the cured material has a glass transition temperature in the range about 10-30° C. In some cases, the cured material has a Shore A hardness of about 30 at about 20° C. In some cases, the cured material has a Shore A hardness of about 19 at about 20° C. In some cases, the cured material in the tough state has a toughness in the range about 3-30 MJ/m$^3$. In some embodiments, the cured material in the tough state has a toughness in the range about 30-100 MJ/m$^3$. In some cases, the cured material in the glassy state has an elastic modulus less than 5 GPa, greater than 2 GPa, or greater than 1 GPa. In some cases, the cured material in the glassy state has an elastic modulus between 2 and 5 GPa.

Further embodiments of the disclosure may include a photopolymerizable resin for additive manufacturing, the resin comprising: less than about 5% of a thiol, at least about 50% of one or more monomers; and a photoinitiator, wherein the photoinitiator may be configured to form a free radical after exposure to light, such that the free radical initiates growth of one or more polymer chains including at least the difunctional and monofunctional monomers; wherein the resin may be configured to react by exposure to light to form a cured material, wherein the cured material has a glass transition temperature in the range about 5-30° C.

In specific cases, the resin further comprises a difunctional oligomer. In some cases, the difunctional oligomer is less than about 45% by weight of the resin. In some cases, the thiol is about 1/2-5% by weight of the resin. In some cases, the one or more monomers is about 1-95% by weight of the resin. In some cases, the photoinitiator is 0.01-3% by weight of the resin.

The resin may further comprise a trifunctional monomer. In some cases, the trifunctional monomer includes trimethylolpropane triacrylate.

Another embodiment of the disclosure provides a photopolymerizable resin for additive manufacturing, the resin comprising: about 5-15 parts per hundred rubber ("phr") of a thiol; about 20-60% of a difunctional acrylic oligomer; and about 40-80% of one or more monofunctional acrylic monomers wherein the resin may be configured to react by exposure to light to form a cured material.

A further embodiment of the disclosure provides a photopolymerizable resin for additive manufacturing, the resin comprising: about 4 to 6 phr of Pentaerythritol tetrakis (3-mercaptobutylate):about 40% to 50% of CN9167; and about 50% to 60% of hydroxypropyl acrylate; wherein the resin may be configured to react by exposure to light to form a cured material.

Another embodiment of the disclosure provides a photopolymerizable resin for three-dimensional printing, the resin comprising: about 5-20 phr of a thiol; about 0-5 phr of polydimethylsiloxane acrylate copolymer; about 20-100% of a difunctional acrylic oligomer; and about 0-80% of at least one of a monofunctional acrylic monomer; wherein the resin may be configured to react by exposure to light to form a cured material. [108] Another embodiment of the disclosure provides a photopolymerizable resin for three-dimensional printing, the resin comprising: about 4 to 6 phr of Pentarythritol tetrakis (3-mercaptobutylate); about 20% to 40% of CN9004; and about 60% to 80% of hydroxypropyl acrylate; wherein the resin may be configured to react by exposure to light to form a cured material.

Another aspect of the disclosure provides a photopolymerizable resin for three-dimensional printing, the resin comprising: about 5-10 phr of a thiol; about 0-20% of trimethylolpropane triacrylate; about 30-50% of at least one of a difunctional acrylic oligomer; about 50-86% of isobornyl acrylate; and about 0-21% of hydroxypropyl acrylate; wherein the resin may be configured to react by exposure to light to form a cured material.

Another aspect of the disclosure provides a photopolymerizable resin for three-dimensional printing, the resin comprising: about 4 to 6 phr of Pentaerythritol tetrakis (3-mercaptobutylate); about 0% to 5% of Trimethylolpropane triacrylate; about 25% to 35% of CN9004; and about 65% to 75% of Isobornyl acrylate; wherein the resin may be configured to react by exposure to light to form a cured material.

Another embodiment of the disclosure provides a photopolymerizable resin for three-dimensional printing, the resin comprising: about 5-10 phr of a thiol; about 0-5% of trimethylolpropane triacrylate; about 30-50% of at least one of a difunctional acrylic oligomer; about 5-75% of isobornyl acrylate; and about 0-80% of hydroxypropyl acrylate; wherein the resin may be configured to react by exposure to light to form a cured material.

A photopolymerizable resin for additive manufacturing can be prepared in accordance with the following procedure.

Resins can be printed in a Top-Down, DLP printer (such as the Octave Light R1), in open atmosphere and ambient conditions. The printing vat may be loaded with Z-fluid (usually, 70-95% of the total volume), and then printing resin is put atop the Z-fluid (in commensurate levels; e.g. 5-30%). Printing parameters are input into the controlling software: exposure time (which usually ranges from 0.1-20 seconds), layer height (which usually ranges from 10-300 micrometers), and the surface is recoated between each layer in 0.25-10 seconds. A computer-aided design ("CAD") file is loaded into the software, oriented and supported as necessary, and the print is initiated. The print cycle is: the build-table descends to allow the resin to coat the surface, ascends to a layer-height (also called the Z-axis resolution) below the resin surface, the recoater blade smooths the surface of the resin, and the optical engine exposes a mask (cross-sectional image of the printed part, at the current height) causing the liquid resin to gel. The process repeats, layer by layer, until the article is finished printing. In some embodiments, the 3D printed resin pals are post-processed by curing at a temperature between 0-100° C. for between 0 to 5 hours under UV irradiation of 350-40 nm.

The liquid thiolacrylate resins and additives can be purchased from the manufacturer Adaptive3D, under the commercial name Elastic Tough Rubber ("ETR90") in Plano, Tex.

Figure 5:
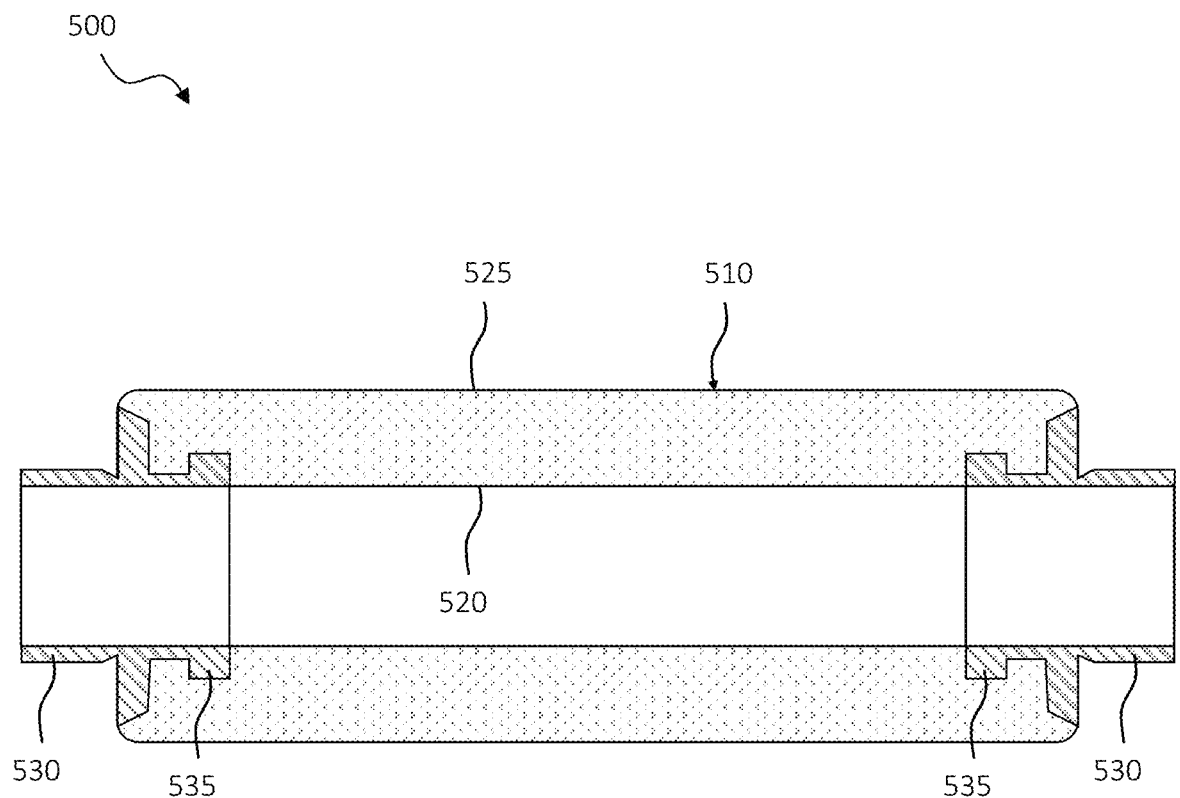
FIG. 5 illustrates a cross-sectional diagram depicting a downhole sealing device having an elastomeric element designed, manufactured and operated according to the disclosure.

FIG. 5 is a cross-sectional diagram depicting a downhole sealing device 500 having an elastomeric element 510 designed, manufactured and operated according to the disclosure. For example, the elastomeric element 510 could comprise a thiourethane/acrylate polymer manufactured using any one, or a combination of, the manufacturing processes discussed above. In the illustrated embodiment, the elastomeric element 510 is positioned between first and second end plates 530. In one or more embodiments, the first and second end plates 530 include a hook feature 535 that secures the elastomeric element 510 sufficiently for the first and second end plates 530 to apply expansion forces (e.g., for the first and second end plates 530 to pull on the elastomeric element 510). The elastomeric element 510 can include an inner surface 520 having an internal diameter and an outer surface 525 having an external diameter.

Figure 6:
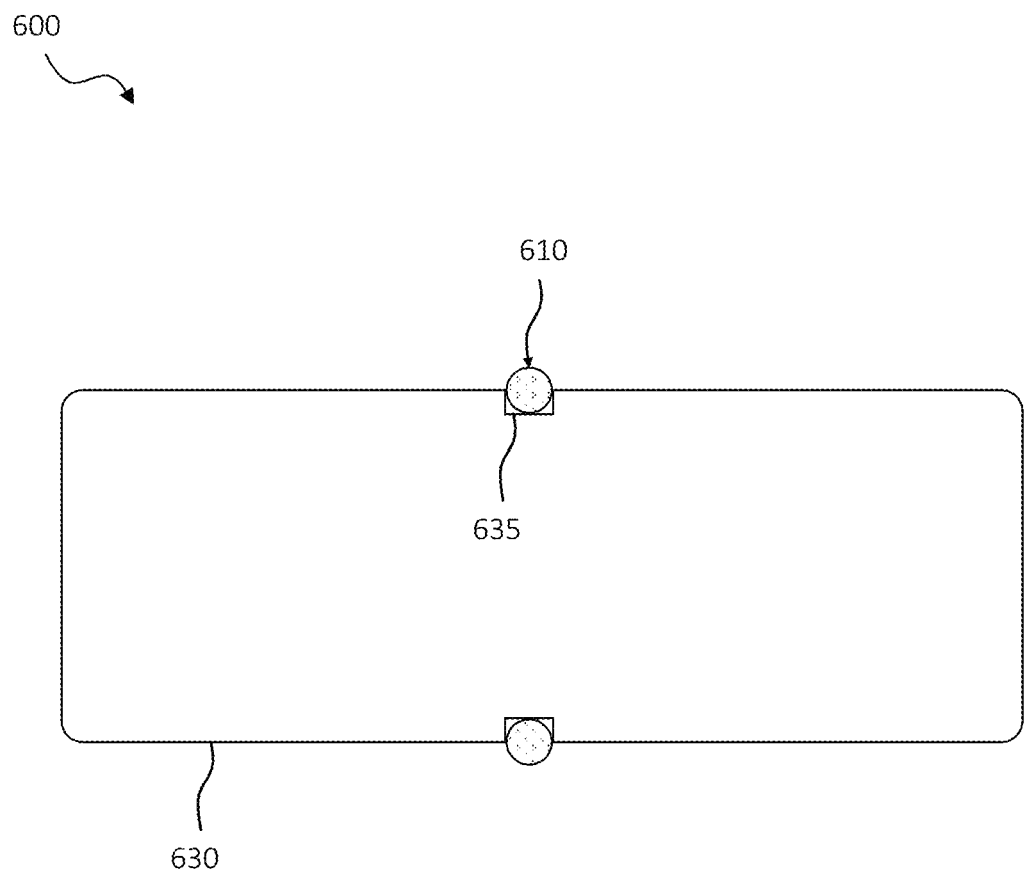
FIG. 6 illustrates a cross-sectional diagram depicting an alternative downhole sealing device having an elastomeric element designed, manufactured and operated according to the disclosure.

FIG. 6 is a cross-sectional diagram depicting an alternative downhole sealing device 600 having an elastomeric element 610 designed, manufactured and operated according to the disclosure. For example, the elastomeric element 610 could comprise a thiourethane/acrylate polymer manufactured using any one, or a combination of, the manufacturing processes discussed above. In the illustrated embodiment, the elastomeric element 610 is positioned in a groove 635 in a sealing feature 630 (e.g., single sealing feature). Thus, in accordance with at least this embodiment, the elastomeric element 610 is an O-ring or other thin cross-sectional geometry sealing element positioned within the groove 635. In contrast to the downhole sealing device 500, the downhole sealing device 600 may employ fluid pressure to axially compress the elastomeric element 610 to engage the tubular, wellbore, etc. Further to the embodiment of FIG. 6, the elastomeric element 610 is a single element elastomeric element.

Figure 7:
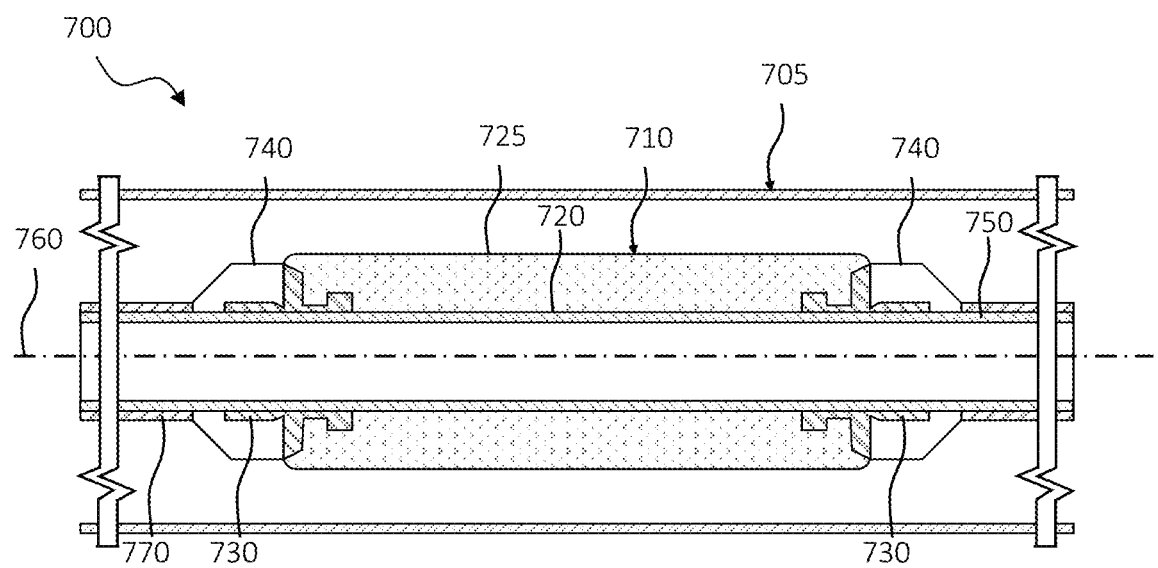
FIG. 7 illustrates a cross-sectional diagram depicting a downhole sealing device in an uncompressed state positioned within a tubular according to certain aspects of the present disclosure.

FIG. 7 is a cross-sectional diagram depicting a downhole sealing device 700 in an uncompressed state positioned within a tubular 705 according to certain aspects of the present disclosure. The tubular 705 can be any suitable tubular, such as a wellbore, a casing string, or a downhole tool. The downhole sealing device 700, in accordance with the disclosure, includes an elastomeric element 710 designed, manufactured and operated according to the disclosure. For example, the elastomeric element 710 could comprise a thiourethane/acrylate polymer manufactured using any one, or a combination of, the manufacturing processes discussed above. In the illustrated embodiment of FIG. 7, the elastomeric element 710 is positioned between first and second end plates 730, and includes an inner diameter 720 and an outer diameter 725. First and second anti-extrusion devices 740, shown schematically, can be located adjacent to the first and second end plates 730, opposite the elastomeric element 710. The anti-extrusion devices 740 can be in a closed state, but upon application of axial compressive force, can actuate into an open state.

A mandrel 750 may, in certain embodiments, be located within the inner diameter 720 of the elastomeric element 710 such that the elastomeric element 710 fits around the mandrel 750. The mandrel 750 can provide support to the elastomeric element 710 during axial compression to keep the elastomeric element 710 from deforming radially inwards (e.g., towards a central longitudinal axis 760). The mandrel 750 can have an inner diameter, but in other examples it does not. The annulus that is sealable by the downhole sealing device 700 can be the annulus between the outer diameter of the mandrel 750 and an inner diameter of the surrounding tubular 705.

When in an uncompressed state, the downhole sealing device 700 can move freely within the tubular 705. To move the downhole sealing device 700 into a compressed state, and seal the tubular 705, axial force (e.g., force applied towards the elastomeric element 710 parallel the longitudinal axis 760 of the elastomeric element 710) can be applied. Axial force can be applied through the first and second end plates 730. In some cases, axial force can be applied through an axial compression tool 770. The axial compression tool 770 may be any tool capable of inducing axial compressive forces in the downhole sealing device 700. The axial compression tool 770 can include a linear actuator positioned in the wellbore (e.g., adjacent to the downhole sealing device 700 or not adjacent to the downhole sealing device) or external to the wellbore. When not positioned adjacent to the downhole sealing device 700, the axial compression tool 770 can include a tubular for conveying the axial compressive forces to the downhole sealing device 700. When axial compressive force is applied, the elastomeric element 710 can be compressed, as shown in FIG. 8.

Figure 8:
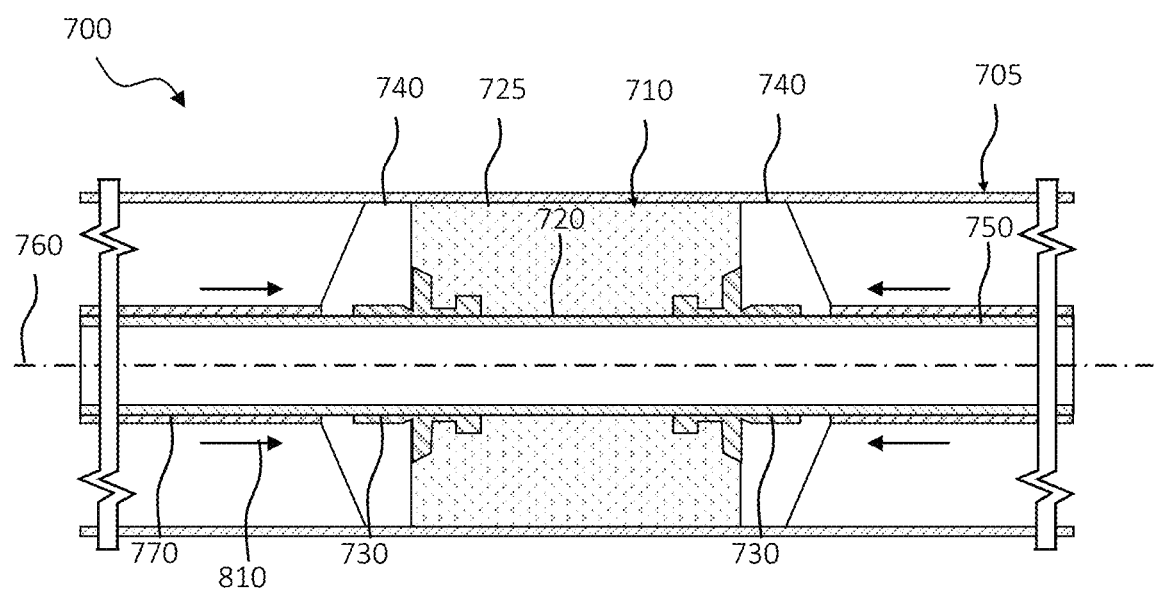
FIG. 8 illustrates a cross-sectional diagram depicting the downhole sealing device of FIG. 7 in a compressed state (e.g., a set state) according to certain aspects of the present disclosure.

FIG. 8 is a cross-sectional diagram depicting the downhole sealing device 700 of FIG. 7 in a compressed state (e.g., a set state) according to certain aspects of the present disclosure. Axial compressive force 810 is applied to the downhole sealing device 700, such as from the axial compression tool 770 and through first and second end plates 730. The axial compressive force 810 causes the elastomeric element 710 to deform. As shown in FIG. 8, the anti-extrusion devices 740 are extended in response to the axially compressive forces 810, and thus in the open state. The anti-extrusion devices 740 can help reduce the gap between the first and second end plates 730 and the tubular 705, inhibiting extrusion or deformation of the elastomeric element 710 too far beyond the first and second end plates 730. When in a compressed state, the elastomeric element 710 can expand in outer diameter sufficiently to seal the tubular 720, such as by filling the annulus between the mandrel 750 and the tubular 705.

Figure 9:
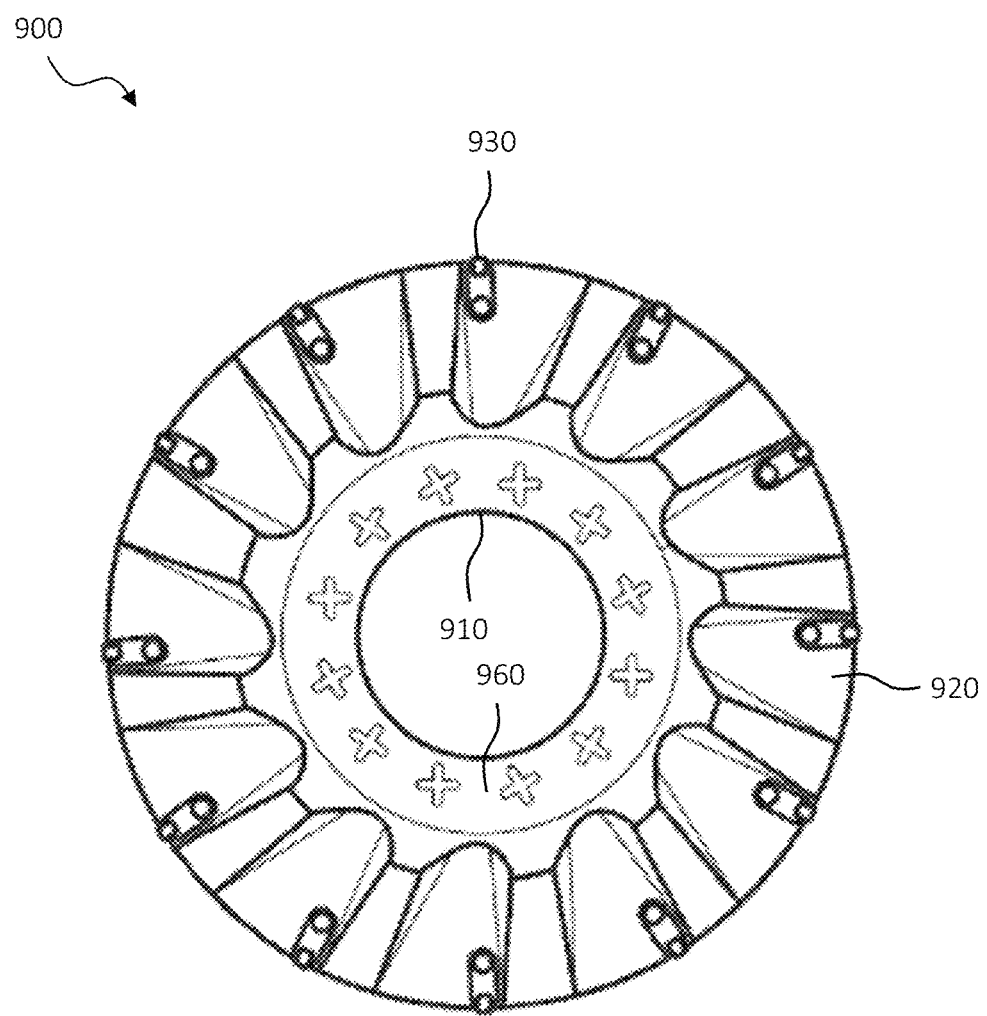
FIG. 9 illustrates an end view of an anti-extrusion device in an expanded state according to certain aspects of the present disclosure.

FIG. 9 is an end view of an anti-extrusion device 900 in an expanded state according to certain aspects of the present disclosure. The anti-extrusion device 900 can include a central aperture 910 through which a mandrel or other tubular may pass. When in an expanded state (e.g., under axial compression), blocking faces 920 may be rotated to be perpendicular to a longitudinal axis of the anti-extrusion device 900. The blocking faces 920 block the extrusion element from expanding too far past the end plates, as described herein.

Rollers 930 can be present on the ends of the blocking faces 920 adjacent to where the blocking face 920 would contact or nearly contact the inner diameter of the tubular into which it has been placed. These rollers 930 can facilitate expansion of the anti-extrusion device 900. These rollers 930 can also facilitate positioning of the anti-extrusion device 900 within the tubular.

Figure 10:
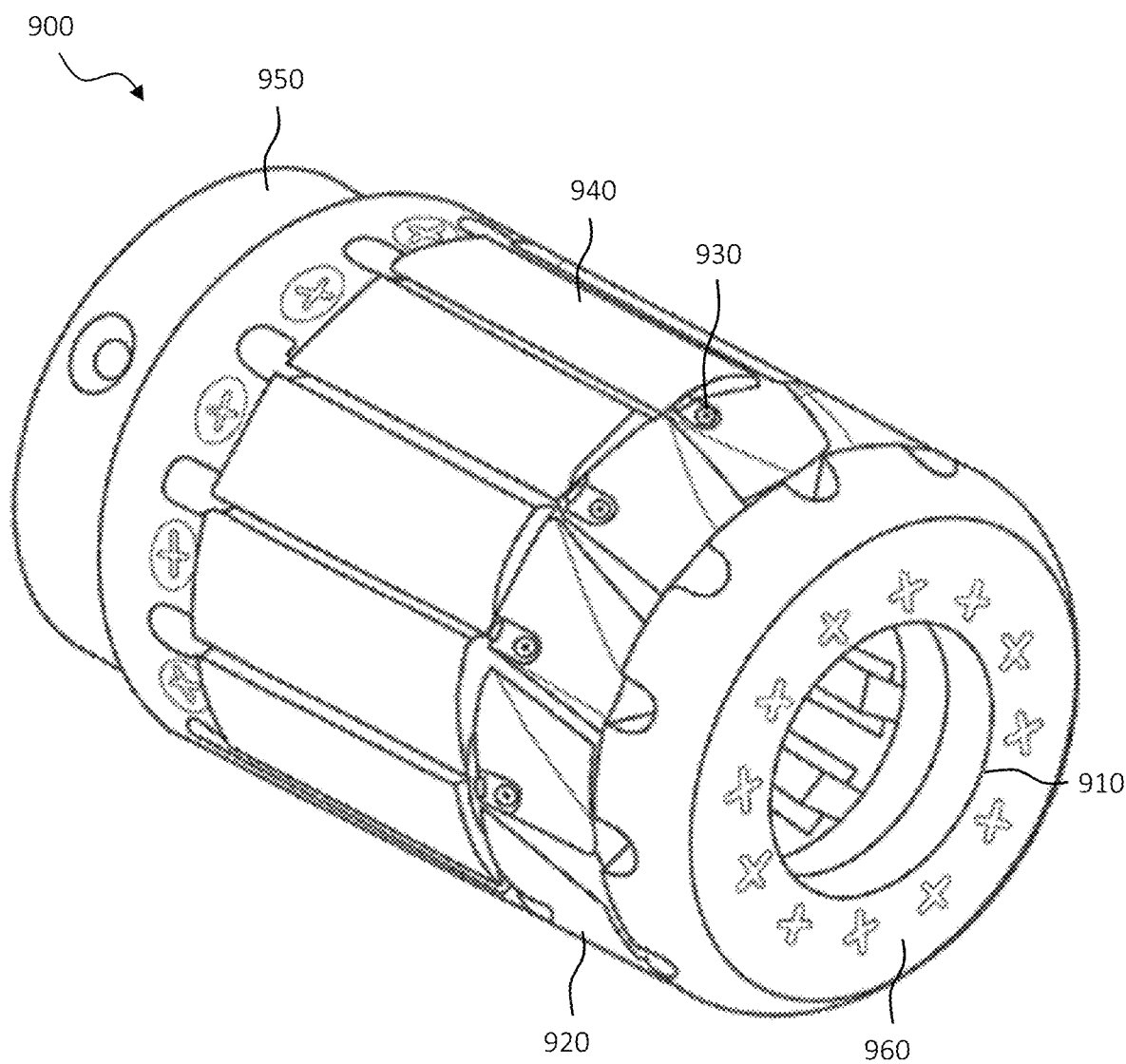
FIG. 10 illustrates an isometric view of the anti-extrusion device of FIG. 9 in a retracted state according to certain aspects of the present disclosure.

FIG. 10 is an isometric view of the anti-extrusion device 900 of FIG. 9 in a retracted state according to certain aspects of the present disclosure. The anti-extrusion device 900 can be biased towards a retracted state such that removal of axial compressive forces causes the anti-extrusion device 900 to move to the retracted state. In some cases, the anti-extrusion device 900 can be moved to the retracted state by axially pulling forces (e.g., opposite of axially compressive forces) being applied to it.

When in a retracted state, the blocking faces 920 are moved to a position parallel or approximately parallel to the longitudinal axis of the anti-extrusion device 900. The rollers 930, being positioned at the ends of the blocking faces 920, are thusly retracted away from the inner diameter of the tubular into which the anti-extrusion device 900 is placed. Longitudinal supports 940 are shown in a retracted state, parallel or generally parallel to the longitudinal axis of the anti-extrusion device 900.

When axially compressive forces are applied to the anti-extrusion device 900, a rear body 950 is pushed towards a front body 960. As the rear body 950 moves towards the front body 960, the blocking faces 920 rotate outwards, along with the distal ends of the longitudinal supports 940, forming a triangular support where the angle between a blocking face 920 and its longitudinal support 940 is less than 90°. Under axially compressive forces, the anti-extrusion device 900 moves from the retracted state of FIG. 10 into the expanded state of FIG. 11.

Figure 11:
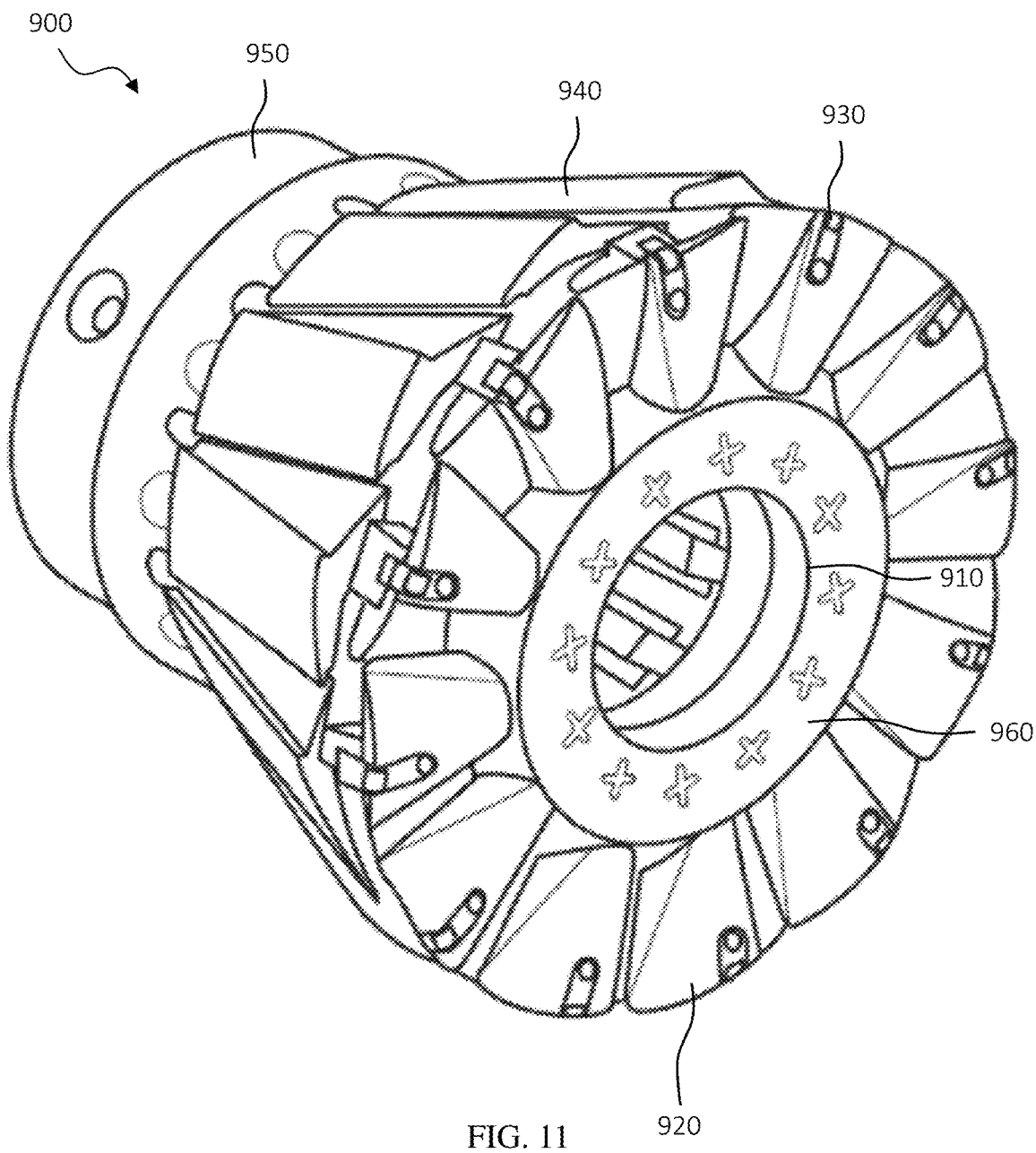
FIG. 11 illustrates an isometric view of the anti-extrusion device of FIG. 9 in an expanded state according to certain aspects of the present disclosure.

FIG. 11 is an isometric view of the anti-extrusion device 900 of FIG. 9 in an expanded state according to certain aspects of the present disclosure. The blocking faces 920 are shown extended and available to block extrusion of an elastomeric element. The rollers 930 are seen at the ends of the blocking faces 920. The longitudinal supports 940 are shown supporting the blocking face 920.

In some cases, one or more rollers 930 can be positioned on each blocking face 920 or the distal end of each longitudinal support 940 such that the roller 930 is positioned adjacent to the inner diameter of a tubular when the anti-extrusion device 900 is positioned within a tubular in the expanded state. These rollers 930 can be uni-axial rollers (e.g., flat rollers) or can be multi-axial rollers (e.g., partially-captured ball bearings).

Figure 12:
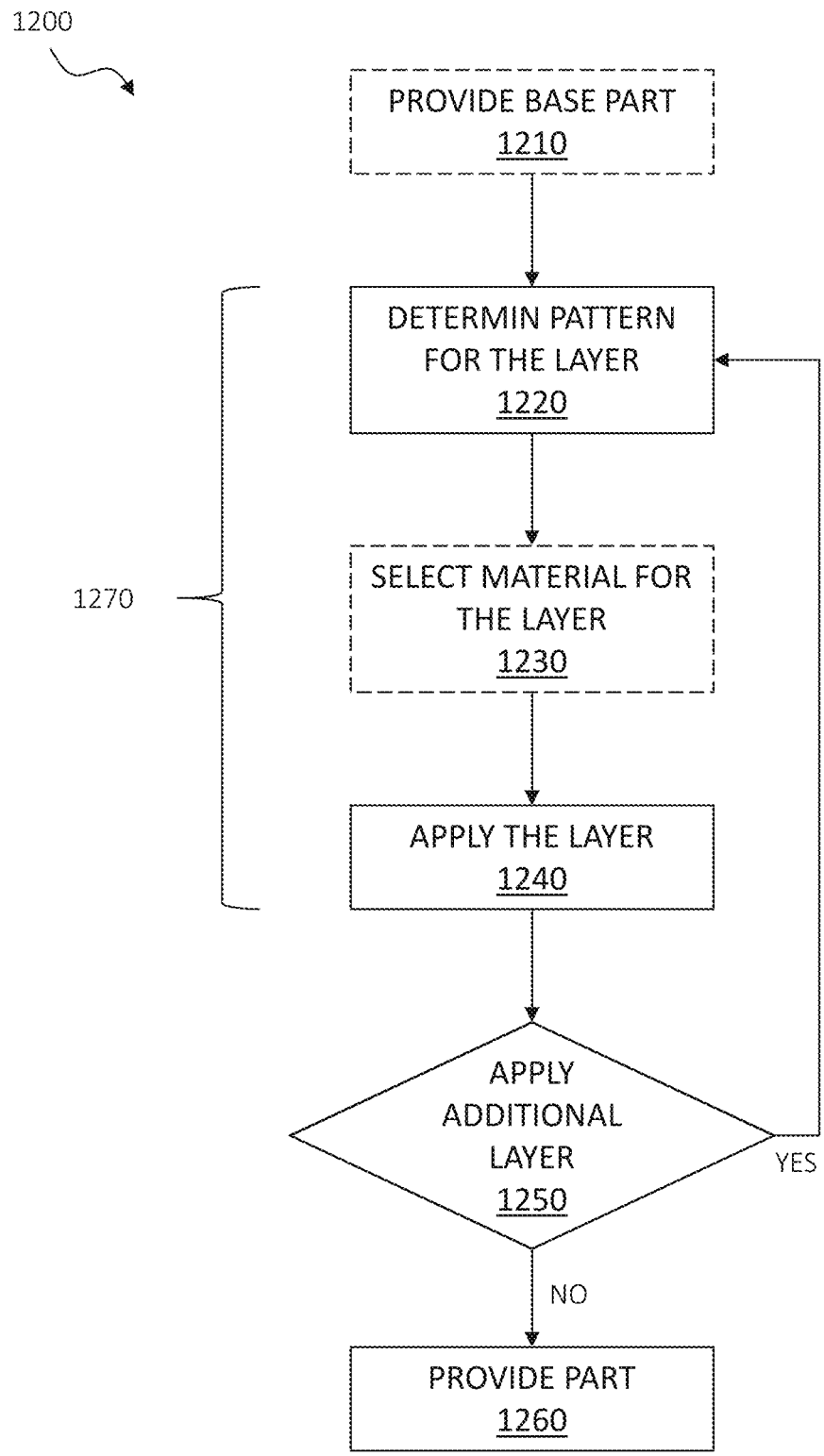
FIG. 12 illustrates a flowchart depicting a process for forming a downhole sealing device according to certain aspects of the present disclosure.

FIG. 12 is a flowchart depicting one process 1200 for forming a downhole sealing device according to certain aspects of the present disclosure. As described herein, any suitable techniques can be used. In at least one embodiment, any suitable additive manufacturing technique can be used, allowing for the application of individual layers (e.g., full layers or portions of layers) to be applied sequentially in order to form the full elastomeric element. The elastomeric element can be formed in isolation from other parts of the downhole sealing device, or can be formed with one or more parts of the downhole sealing device. For example, the elastomeric element can be formed around the first and second end plates, a mandrel, or any combination thereof.

At optional block 1210 a base part can be provided. The base part can be the mandrel, one or more end plates, or any combination thereof. In some cases, when the elastomeric element is formed in isolation from other parts of the downhole sealing device, block 1210 may be skipped.

At block 1220, a pattern for the elastomeric material is determined. The pattern can be the first layer or any subsequent layer of the elastomeric material, including the final layer. The pattern can include the shape of the layer.

At optional block 1230, the material for the layer can be selected. The material can be any suitable elastomeric material consistent with the disclosure. In at least one embodiment, the material may be any of the materials disclosed above for forming an elastomeric element comprising a thiourethane/acrylate polymer. Furthermore, additives may be included with the material, thus making the elastomeric element not only more thermally stable but having a greater magnitude of modulus.

At block 1240, the layer of elastomeric material can be applied. The layer can be applied directly to the base part, to a temporary part (e.g., a part that will be removed from the elastomeric element before the elastomeric element is incorporated into the wellbore sealing apparatus), a building platform (e.g., a surface which can be used to temporarily build the elastomeric element before the elastomeric element is removed to be incorporated into the wellbore sealing apparatus), or a previously applied layer of elastomeric material. A layer can be applied using any suitable method appropriate for the style of additive manufacturing being used.

The process of applying the layer in block 1240, may be any known or hereafter discovered 3D printing process, without limitation includes SLA and/or DLP printing. For example, a commercially available desktop polymer 3D printer (e.g., Octave Light printer) could be used to apply the layer in block 1240. Consequently, the layers, and thus the elastomeric element, can be made on demand, for example in the field service shop.

Blocks 1220, 1230, and 1240 can constitute a layering iteration 1270. Multiple layering iterations 1270 can be used to produce an elastomeric element.

At block 1250, the process 1200 can determine whether an additional layer should be applied. If an additional layer is to be applied, the process 1200 can perform another layering iteration 1270 by continuing at block 1220 to determine the pattern for the additional layer.

When multiple materials are used, two or more sequentially-applied layers may be applied in the same plane as one another, but consisting of differing materials. For example, to produce a single layer having the appearance of a filled-in circle of a first material within a square field of a second material, a first layering iteration 1270 can be performed to apply the first material in the circular shape, and a second layering iteration 1270 can be performed to apply the second material in the square shape. Thus, at block 1240, if the current layer is being applied to a previously applied layer of elastomeric material, the current layer does not necessarily need to be applied to the layer that was applied in the immediately-previous iteration, but can be applied to a layer that was previously applied two or more iterations ago.

At block 1250, if the process 1200 determines that no additional layers need be applied, the part can be provided at block 1260. Providing the part can include providing the elastomeric element or any other part or combination of parts formed using process 1200. Providing the part can include performing further assembly of the part with one or more other parts. Providing the part can include providing the part to another process or additional steps not shown in process 1200. In some cases, providing the part can include performing additional finishing, such as additional finishing of the elastomeric element. For example, additional finishing can include surface polishing or texturization, or even subsequent machining. Providing the part can be providing the part for use, such as use in a wellbore or tubular.

Process 1200 describes how an elastomeric element can be formed through sequential layering iterations 1270. The layering iterations 1270 can form the elastomeric element in any suitable orientation. For example, each layer of the elastomeric element can be generally cylindrical in shape, growing in diameter for subsequent layers. In another example, each layer can be generally annular or ring-like in shape, with each layer being perpendicular to the longitudinal axis of the elastomeric element (e.g., the elastomeric element 310 of FIG. 3 if it were formed using consecutive layers from left to right). Other layer orientations can be used.

In some cases, a layering iteration 1270 can include applying a layer of a temporary material. The temporary material can be any material able to be easily removed from the elastomeric element without damage to the elastomeric element. For example, the temporary material can be a material having a melting point lower than the elastomeric element. In some cases, the temporary material can be a water-soluble material or loosely-bound material capable of being washed away from the elastomeric element. The temporary material can be applied in a layering iteration 1270 in order to provide temporary structural support for subsequent layers applied in subsequent layering iterations 1270. Once the elastomeric element has been formed, a finishing operation can include removing any temporary material, thus leaving voids or channels wherever the temporary material was used.

In yet another embodiment, no layering process is required. For example, in at least one other embodiment, the pattern may be a mold. Accordingly, a selected material (e.g., as discussed in the paragraphs above) may be placed within a mold having a specific three-dimensional shape. The selected material may then be subjected to UV light though the UV permeable mold, thereby forming the elastomeric element.

Aspects disclosed herein include:

A. A downhole sealing device, the downhole sealing device including: 1) one or more downhole sealing features, and 2) an elastomeric element comprising a thiourethane/acrylate polymer coupled to the one or more downhole sealing features, the elastomeric element operable to be compressed in a downhole application against a tubular.

B. A well system, the well system including: 1) a wellbore located in a subterranean formation, and 2) a downhole sealing device positioned within the wellbore, the downhole sealing device including: a) one or more downhole sealing features, and b) an elastomeric element comprising a thiourethane/acrylate polymer coupled to the one or more downhole sealing features, the elastomeric element operable to be compressed against a surface in the wellbore.

C. A method for sealing within a wellbore, the method including: 1) positioning a downhole sealing device within a wellbore located within a subterranean formation, the downhole sealing device including; a) one or more downhole sealing features; and b) an elastomeric element comprising a thiourethane/acrylate polymer coupled to the one or more downhole sealing features; and 2) subjecting the elastomeric element to an axial compressive force, the axial compressive force compressing the elastomeric element against a surface in the wellbore.

Aspects A, B, and C may have one or more of the following additional elements in combination: Element 1: wherein the thiourethane/acrylate polymer is a thiourethane polymer. Element 2: wherein the thiourethane/acrylate polymer is a thiolacrylate polymer. Element 3: wherein the thiourethane/acrylate polymer is a blended combination of a thiourethane polymer and a thiolacrylate polymer. Element 4: wherein the elastomeric element is operable to be compressed in the downhole application against the tubular and operable to seal at least 6,900 kPa of pressure differential at a temperature of at least 80° C. Element 5: wherein the elastomeric element is operable to be compressed in the downhole application against the tubular and operable to seal at least 20,700 kPa of pressure differential at a temperature of at least 80° C. Element 6: wherein the elastomeric element is operable to be compressed in the downhole application against the tubular and operable to seal at least 20,700 kPa of pressure differential at temperatures as low as −65° C. and as high as 270° C. Element 7: wherein the elastomeric element is operable to be compressed in the downhole application against the tubular and operable to seal at least 27,575 kPa pressure differential at temperatures of at least 80° C. Element 8: wherein the elastomeric element is operable to be compressed in the downhole application against the tubular and operable to seal at least 27,575 kPa of pressure differential at temperatures as low as −65° C. and as high as 270° C. Element 9: wherein the elastomeric element has a fracture toughness of at least 40 MJ/m$^3$ and a tensile strength of at least 25 MPa. Element 10: wherein the one or more downhole sealing features are first and second end plates coupled to opposing ends of the elastomeric element, the first and second end plates configured to move with respect to one another to axially compress the elastomeric element to engage the tubular. Element 11: wherein the elastomeric element and first and second end plates are positioned between first and second anti-extrusion devices, the first and second anti-extrusion devices configured to expand in diameter when subjected to an axial compressive force such that the elastomeric element cannot deform axially past the first and second end plates. Element 12: wherein the one or more metal sealing features are a single metal sealing feature having a groove located therein, and further wherein the elastomeric element is an O-ring positioned within the groove. Element 13: wherein the elastomeric element is a single element. Element 14: wherein the elastomeric element is a 3D printed element manufactured using a VAT resin formed using a liquid mixture including: a first type of monomer including two or more thiol functional groups; a second type of monomer including two or more isocyanate functional groups; a photolatent base, wherein the photolatent base is decomposable upon exposure to a light to form a non-nucleophillic base catalyst having a pKa greater than 7; an anionic step-growth polymerization reaction inhibitor, the inhibitor having an acidic group configured to form an acid-base pair with the non-nucleophillic base; and a light absorber having an absorbance in the liquid mixture that is greater than an absorbance of the photolatent base at a wavelength of the light used for the exposure. Element 15: wherein the elastomeric element is a 3D printed element manufactured using a VAT resin formed using a liquid mixture including: a crosslinking component; at least one monomer and/or oligomer; and a chain transfer agent comprising at least one of a thiol, a secondary alcohol, and/or a tertiary amine, wherein the resin may be configured to react by exposure to light to form a cured solid material. Element 16: wherein the surface in the wellbore is wellbore casing. Element 17: wherein the one or more downhole sealing features are first and second end plates coupled to opposing ends of the elastomeric element, the first and second end plates configured to move with respect to one another to axially compress the elastomeric element to engage the surface in the wellbore. Element 18: wherein the elastomeric element and first and second end plates are positioned between first and second anti-extrusion devices, the first and second anti-extrusion devices configured to expand in diameter when subjected to an axial compressive force such that the elastomeric element cannot deform axially past the first and second end plates. Element 19: wherein the one or more metal sealing features are a single metal sealing feature having a groove located therein, and further wherein the elastomeric element is an O-ring positioned within the groove. Element 20: wherein the downhole sealing device is a first downhole sealing device, and further including a second downhole sealing device positioned proximate the first downhole sealing device. Element 21: wherein the second downhole sealing device comprises a polymeric material different from the thiourethane/acrylate polymer.

Those skilled in the art to which this application relates will appreciate that other and further additions, deletions, substitutions and modifications may be made to the described embodiments.

What is claimed is:

1. A downhole sealing device, comprising:
  one or more downhole sealing features; and
  an elastomeric element comprising a thiourethane/acrylate polymer coupled to the one or more downhole sealing features, the elastomeric element operable to be compressed in a downhole application against a tubular, wherein the elastomeric element is a 3D printed element manufactured using a VAT resin formed using a liquid mixture including:
  a crosslinking component;
  at least one monomer and/or oligomer; and
  a chain transfer agent comprising at least one of a thiol, a secondary alcohol, and/or a tertiary amine, wherein the resin is configured to react by exposure to light to form a cured solid material.

2. The downhole sealing device as recited in claim 1, wherein the thiourethane/acrylate polymer is a thiourethane polymer.

3. The downhole sealing device as recited in claim 1, wherein the thiourethane/acrylate polymer is a thiolacrylate polymer.

4. The downhole sealing device as recited in claim 1, wherein the thiourethane/acrylate polymer is a blended combination of a thiourethane polymer and a thiolacrylate polymer.

5. The downhole sealing device as recited in claim 1, wherein the elastomeric element is operable to be compressed in the downhole application against the tubular and operable to seal at least 6,900 kPa of pressure differential at a temperature of at least 80° C.

6. The downhole sealing device as recited in claim 1, wherein the elastomeric element is operable to be compressed in the downhole application against the tubular and operable to seal at least 20,700 kPa of pressure differential at a temperature of at least 80° C.

7. The downhole sealing device as recited in claim 1, wherein the elastomeric element is operable to be compressed in the downhole application against the tubular and operable to seal at least 20,700 kPa of pressure differential at temperatures as low as −65° C. and as high as 270° C.

8. The downhole sealing device as recited in claim 1, wherein the elastomeric element is operable to be compressed in the downhole application against the tubular and operable to seal at least 27,575 kPa pressure differential at temperatures of at least 80° C.

9. The downhole sealing device as recited in claim 1, wherein the elastomeric element is operable to be compressed in the downhole application against the tubular and operable to seal at least 27,575 kPa of pressure differential at temperatures as low as −65° C. and as high as 270° C.

10. The downhole sealing device as recited in claim 1, wherein the elastomeric element has a fracture toughness of at least 40 MJ/m$^3$ and a tensile strength of at least 25 MPa.

11. The downhole sealing device as recited in claim 1, wherein the one or more downhole sealing features are first and second end plates coupled to opposing ends of the elastomeric element, the first and second end plates configured to move with respect to one another to axially compress the elastomeric element to engage the tubular.

12. The downhole sealing device as recited in claim 11, wherein the elastomeric element and first and second end plates are positioned between first and second anti-extrusion devices, the first and second anti-extrusion devices configured to expand in diameter when subjected to an axial compressive force such that the elastomeric element cannot deform axially past the first and second end plates.

13. The downhole sealing device as recited in claim 1, wherein the one or more downhole sealing features are a single metal sealing feature having a groove located therein, and further wherein the elastomeric element is an O-ring positioned within the groove.

14. The downhole sealing device as recited in claim 1, wherein the elastomeric element is a single element.

15. The downhole sealing device as recited in claim 1, wherein the elastomeric element is a 3D printed element manufactured using a VAT resin formed using a liquid mixture including:
  a first type of monomer including two or more thiol functional groups;
  a second type of monomer including two or more isocyanate functional groups;
  a photolatent base, wherein the photolatent base is decomposable upon exposure to a light to form a non-nucleophillic base catalyst having a pKa greater than 7;
  an anionic step-growth polymerization reaction inhibitor, the inhibitor having an acidic group configured to form an acid-base pair with the non-nucleophillic base catalyst; and
  a light absorber having an absorbance in the liquid mixture that is greater than an absorbance of the photolatent base at a wavelength of the light used for the exposure.

16. A well system, comprising:
  a wellbore located in a subterranean formation; and
  a downhole sealing device positioned within the wellbore, the downhole sealing device including:
    one or more downhole sealing features; and
    an elastomeric element comprising a thiourethane/acrylate polymer coupled to the one or more downhole sealing features, the elastomeric element operable to be compressed against a surface in the wellbore, wherein the elastomeric element is a 3D printed element manufactured using a VAT resin formed using a liquid mixture including:
  a crosslinking component;
  at least one monomer and/or oligomer; and
    a chain transfer agent comprising at least one of a thiol, a secondary alcohol, and/or a tertiary amine, wherein the resin is configured to react by exposure to light to form a cured solid material.

17. The well system as recited in claim 16, wherein the elastomeric element is operable to be compressed in the downhole application against the tubular and operable to seal at least 6,900 kPa of pressure differential at a temperature of at least 80° C.

18. The well system as recited in claim 16, wherein the surface in the wellbore is wellbore casing.

19. The well system as recited in claim 16, wherein the one or more downhole sealing features are first and second end plates coupled to opposing ends of the elastomeric element, the first and second end plates configured to move with respect to one another to axially compress the elastomeric element to engage the surface in the wellbore.

20. The well system as recited in claim 19, wherein the elastomeric element and first and second end plates are positioned between first and second anti-extrusion devices, the first and second anti-extrusion devices configured to expand in diameter when subjected to an axial compressive force such that the elastomeric element cannot deform axially past the first and second end plates.

21. The well system as recited in claim 16, wherein the one or more downhole sealing features are a single metal sealing feature having a groove located therein, and further wherein the elastomeric element is an O-ring positioned within the groove.

22. The well system as recited in claim 16, wherein the elastomeric element is a 3D printed element manufactured using a VAT resin formed using a liquid mixture including:
  a first type of monomer including two or more thiol functional groups;
  a second type of monomer including two or more isocyanate functional groups;
  a photolatent base, wherein the photolatent base is decomposable upon exposure to a light to form a non-nucleophillic base catalyst having a pKa greater than 7;
  an anionic step-growth polymerization reaction inhibitor, the inhibitor having an acidic group configured to form an acid-base pair with the non-nucleophillic base catalyst; and
  a light absorber having an absorbance in the liquid mixture that is greater than an absorbance of the photolatent base at a wavelength of the light used for the exposure.

23. The well system as recited in claim 16, wherein the downhole sealing device is a first downhole sealing device, and further including a second downhole sealing device positioned proximate the first downhole sealing device.

24. The well system as recited in claim 23, wherein the second downhole sealing device comprises a polymeric material different from the thiourethane/acrylate polymer.

25. A method for sealing within a wellbore, comprising:
  positioning a downhole sealing device within a wellbore located within a subterranean formation, the downhole sealing device including:
    one or more downhole sealing features; and
    an elastomeric element comprising a thiourethane/acrylate polymer coupled to the one or more downhole sealing features, wherein the elastomeric element is a 3D printed element manufactured using a VAT resin formed using a liquid mixture including:
      a crosslinking component;
      at least one monomer and/or oligomer; and
      a chain transfer agent comprising at least one of a thiol, a secondary alcohol, and/or a tertiary amine, wherein the resin is configured to react by exposure to light to form a cured solid material; and
  subjecting the elastomeric element to an axial compressive force, the axial compressive force compressing the elastomeric element against a surface in the wellbore.

26. The method as recited in claim 25, wherein the compressed elastomeric element is operable to seal at least 6,900 kPa of pressure differential at a temperature of at least 80° C.

27. The method as recited in claim 25, wherein the one or more downhole sealing features are first and second end plates coupled to opposing ends of the elastomeric element, and further wherein subjecting the elastomeric element to an axial compressive force includes moving the first and second end plates with respect to one another to axially compress the elastomeric element to engage the surface in the wellbore.

28. The method as recited in claim 25, wherein the one or more downhole sealing features are a single metal sealing feature having a groove located therein, the elastomeric element being an O-ring positioned within the groove, and further wherein subjecting the elastomeric element to an axial compressive force includes subjecting the O-ring to fluid pressure to axially compress the elastomeric element to engage the surface in the wellbore.

29. The method as recited in claim 25, further including 3D printing the elastomeric element using a VAT resin formed using a liquid mixture including:
- a first type of monomer including two or more thiol functional groups;
- a second type of monomer including two or more isocyanate functional groups;
- a photolatent base, wherein the photolatent base is decomposable upon exposure to a light to form a non-nucleophillic base catalyst having a pKa greater than 7;
- an anionic step-growth polymerization reaction inhibitor, the inhibitor having an acidic group configured to form an acid-base pair with the non-nucleophillic base catalyst; and
- a light absorber having an absorbance in the liquid mixture that is greater than an absorbance of the photolatent base at a wavelength of the light used for the exposure.

* * * * *

UNITED STATES PATENT AND TRADEMARK OFFICE
CERTIFICATE OF CORRECTION

PATENT NO. : 11,692,412 B2  
APPLICATION NO. : 17/152887  
DATED : July 4, 2023  
INVENTOR(S) : Xiaoguang Allan Zhong, Anthony Phan and Chad William Glaesman Page 1 of 1

It is certified that error appears in the above-identified patent and that said Letters Patent is hereby corrected as shown below:

In the Specification

In Column 18, Line 16, after --in the body or-- delete "car." and insert --ear.--

In Column 21, Line 6, delete "(3-mercaptobutylate):" and insert --(3-mercaptobutylate);--

In Column 21, Line 20, delete "Pentarythritol" and insert --Pentaerythritol--

In Column 22, Line 2, after --3D printed resin-- delete "pals" and insert --parts--

In Column 22, Line 4, after --UV irradiation of-- delete "350-40nm." and insert --350-400nm.--

Signed and Sealed this  
Fifteenth Day of August, 2023

Katherine Kelly Vidal  
*Director of the United States Patent and Trademark Office*